(12) United States Patent
Román-Escutia et al.

(10) Patent No.: US 12,478,648 B2
(45) Date of Patent: Nov. 25, 2025

(54) METHODS OF PURIFYING AN ALLERGEN EXTRACT

(71) Applicant: LETI PHARMA S.L., Tres Cantos (ES)

(72) Inventors: Marta Román-Escutia, Tres Cantos (ES); María Morales, Tres Cantos (ES); María Teresa Gallego, Tres Cantos (ES); Jerónimo Carnés Sánchez, Tres Cantos (ES)

(73) Assignee: LETI PHARMA S.L., Tres Cantos (ES)

( * ) Notice: Subject to any disclaimer, the term of this patent is extended or adjusted under 35 U.S.C. 154(b) by 1013 days.

(21) Appl. No.: 17/423,585

(22) PCT Filed: Mar. 26, 2019

(86) PCT No.: PCT/EP2019/057647
§ 371 (c)(1),
(2) Date: Jul. 16, 2021

(87) PCT Pub. No.: WO2020/147985
PCT Pub. Date: Jul. 23, 2020

(65) Prior Publication Data
US 2022/0110983 A1      Apr. 14, 2022

(30) Foreign Application Priority Data
Jan. 17, 2019   (EP) .................... 19382030

(51) Int. Cl.
*A61K 35/646*   (2015.01)
*A61K 36/63*    (2006.01)
*A61K 36/899*   (2006.01)

(52) U.S. Cl.
CPC ............ *A61K 35/646* (2013.01); *A61K 36/63* (2013.01); *A61K 36/899* (2013.01)

(58) Field of Classification Search
CPC .... A61K 35/646; A61K 36/63; A61K 36/899; A61K 35/68; A61K 35/35; A61K 35/36
See application file for complete search history.

(56) References Cited

U.S. PATENT DOCUMENTS

| | | |
|---|---|---|
| 5,980,904 A | 11/1999 | Leverett et al. |
| 2016/0058859 A1 | 3/2016 | Subiza Garrido-Lestache et al. |
| 2018/0200363 A1 | 7/2018 | Carnes Sanchez |

FOREIGN PATENT DOCUMENTS

| | | |
|---|---|---|
| CN | 1675240 A | 9/2005 |
| CN | 102258464 A | 11/2011 |

(Continued)

OTHER PUBLICATIONS

Abe et al., Comparison of Dermatophagoides pteronyssinus allergens from culture medium extract and whole body extract by using the same probe of pooled human serum, 1987, Allergy, 42, pp. 352-358. (Year: 1987).*

(Continued)

*Primary Examiner* — Trevor Love
(74) *Attorney, Agent, or Firm* — Bookoff McAndrews, PLLC

(57) ABSTRACT

The invention relates to processes for producing semi-purified and purified allergen extracts and pharmaceutical compositions and vaccines for use in the diagnosis and treatment of allergy. In one aspect of the invention, a process for producing a depigmented allergen extract is provided, the process comprising: a) basifying a native allergen extract; and b) removing molecules having a molecular size of less than 3.5 kDa; and c) adjusting the pH to neutrality; thereby to produce a depigmented allergen extract.

11 Claims, 18 Drawing Sheets

(56) References Cited

FOREIGN PATENT DOCUMENTS

| CN | 102552900 A | 7/2012 |
|---|---|---|
| CN | 103649315 A | 3/2014 |
| CN | 103966292 A | 8/2014 |
| EP | 0083497 A2 | 7/1983 |
| EP | 0662080 A1 | 7/1995 |
| JP | S58126816 A | 7/1983 |
| JP | H05125098 A | 5/1993 |
| JP | 2016515603 A | 5/2016 |
| WO | 93/01213 A1 | 1/1993 |
| WO | 9406821 A1 | 3/1994 |
| WO | 2011/098569 A1 | 8/2011 |
| WO | 2011098569 A9 | 8/2011 |
| WO | 2011151449 A1 | 12/2011 |
| WO | 2017215729 A1 | 12/2017 |

OTHER PUBLICATIONS

International Search Report dated Jun. 5, 2019, in PCT/US2019/057647 (7 pages).

Cadot P. et al., "Influence of the pH of the Extraction Medium on the Composition of Birch (Betula Verrucosa) Pollen Extracts," Allergy, vol. 50, No. 5, pp. 431-437 (May 1995).

King T. P. et al., "Limited proteolysis of antigens E and K from ragweed pollen," Archives of Biochemistry and Biophysics, vol. 212, No. 1, pp. 127-135 (Nov. 1981).

Carnes, J. et al., "Allergoids for Allergy Treatment," Recent Patents on Inflammation & Allergy Drug Discovery, vol. 12, No. 2, pp. 110-119 (Sep. 2018).

Lopez-Matas M. et al., "Depigmented Allergoids Reveal New Epitopes with Capacity to Induce IgG Blocking Antibodies," BioMed Research International, vol. 2013, article 284615, p. 108 (2013).

Urry, Z. L. et al., "Depigmented-polymerised allergoids favour regulatory over effector T cells: enhancement by 1a, 25-dihydroxyvitamin D3," Bmc Immunology, vol. 15, No. 1, article 21, pp. 1-8 (May 2014).

Morales, M. et al., "In vitro evidence of efficacy and safety of a polymerized cat dander extract for allergen Immunotherapy," BMC Immunology, vol. 18, No. 1, article 10, pp. 1-7 (Feb. 2017).

Larsen et al., "Allergens and Allergy Immunotherapy (Clinical Allergy and Immunotherapy Series 21", R.F. Lockey and D.K. Ledford eds., 4th ed., 2008, pp. 283-320.

Office Action dated Jun. 13, 2025 and English Translation for Costa Rican Application No. 19382030.5 (12 pages).

\* cited by examiner

METHODS OF PURIFYING AN ALLERGEN EXTRACT

CROSS-REFERENCE TO RELATED APPLICATIONS

This application is a U.S. National Stage filing under 35 U.S.C. § 371 of International Application No. PCT/EP2019/057647, filed on Mar. 26, 2019, which claims priority to EP Application Serial No. 19382030.5, filed on Jan. 17, 2019.

FIELD OF THE INVENTION

The invention relates to processes for producing semi-purified and purified allergen extracts and pharmaceutical compositions and vaccines for use in the diagnosis and treatment of allergy.

BACKGROUND OF THE INVENTION

Allergy is an acquired hypersensitivity disorder of the immune system and is triggered by exposure to harmless environment substances known as allergens. A type I hypersensitivity reaction is characteristic of allergic reactions and results in the production of excessive amounts of IgE antibodies which in turn activate basophils and mast cells causing an inflammatory reaction. The effects may be systemic such as vasodilation, mucus secretion, nerve stimulation or smooth muscle contraction causing an anaphylaxis reaction, or the effects may be confined to a particular area of the body, for example the respiratory system.

*Phleum pratense*

Grass allergy is one of the most common and prevalent forms of allergy that affects sensitized people during certain seasons. Grass pollen is present in the air in late spring and early summer months, which can cause allergic rhinitis, allergic conjunctivitis and asthma. Direct skin contact with grasses, when sitting on grass or mowing the lawn, can cause itching of the skin, urticarial and atopic dermatitis. One of the most representative species of grass is *Phleum pratense*. At least nine different allergens have been identified in the species of *Phleum pratense* and include: Phl p 1, a Beta-expansin of 27 kDa; Phl p 2, a Grass group II/III of 10-12 kDa; Phl p 4, a protein of 55 kDa, Phl p 5 of 32 kDa, Phl p 6 of 11 kDa, Phl p 7 a calcium binding protein of 6 kDa, Phl p 11, an Ole e 1-related protein of 20 kDa, Phl p 12, a profilin of 14 kDa, and Phl p 13, a polygalacturonase of 55 kDa.

*Olea europaea*

In the Mediterranean region, olive pollinosis is an important health problem due to the extensive cultivation of olive trees. Olive trees release large amounts of pollen into the atmosphere. Currently, 12 allergens from *O. europaea* have been described by the WHO/IUIS Allergen Nomenclature Sub-Committee; 11 from pollen and one (thaumatin, also known as Ole e 13) food allergen from the olive fruit. Ole e 1 is the major allergen, recognized by more than 70% of olive pollen sensitized patients. Other allergens include a profilin (Ole e 2), polcalcins (Ole e 3 and Ole e 8), glucanases (Ole e 4 and Ole e 9), a superoxide dismutase (Ole e 5), a lipid transfer protein (Ole e 7), a glycosyl hydrolase (Ole e 10), a pectin methylesterase (Ole e 11) and Ole e 6.

*Dermatophagoides pteronyssinus*

Mites are a major source of sensitization worldwide, especially in regions where humidity and temperature favour their development. Currently, house dust mites (HDMs) belonging to the Pyroglyphidae family are the most abundant mites in indoor habitats and thus the main indoor source of allergens. Nineteen allergens have been described in *D. pteronyssinus* by the WHO/IUIS Allergen Nomenclature Sub-Committee, 9 of them being proteases, having an activity related with allergenicity. The most important allergens are Der p 1 (a 25 kDa cysteine protease) and Der p 2 (a 14 kDa protein of the NPC2 family).

Allergic patients can be treated with drugs to reduce their symptoms and control the peaks of symptoms or they can be treated with specific immunotherapy. However, specific immunotherapy is the only treatment with capacity to modify the course of the disease. Specific immunotherapy (SIT) involves the administration of increasingly larger doses of an allergen extract with the aim of inducing immunological tolerance. Allergen immunotherapy modulates the immune response to the allergen rather than ameliorating the symptoms induced by an allergic reaction, and can either reduce the need for medication, reduce the severity of symptoms or eliminate hypersensitivity altogether.

One of the risks of immunotherapy is that injection of an allergen to a sensitised patient can cause an allergic reaction or anaphylaxis. Since its first use at the beginning of the $20^{th}$ century, many efforts have been made to further improve the safety and efficacy of allergen immunotherapy. One approach is the development of allergoids, which involves employing allergen vaccines with reduced allergenicity but with maintenance of immunogenicity.

EP 0 662 080 (CBF LETI SA) disclose a process for removal of substances and other low molecular weight material in order to purify the allergen extracts and to increase the final allergen/protein content. The process consists of disrupting the electrostatic, hydrophobic or other physical forces under such conditions as to detach non-allergenic compounds from the allergenically active proteins. The process can consist of a mild acid treatment by lowering the pH below the pI of the respective allergen proteins.

One of the various ways of reducing allergenicity consists of chemically modifying native allergen extracts with aldehyde, mainly formaldehyde and glutaraldehyde, to produce allergoids. This aldehyde treatment leads to reaction products (mainly polymers), which have lost part of their allergenicity (i.e. exhibit a reduction of IgE reactive B-cell epitopes), reducing allergic side-effects. At the same time, the native immunogenicity of the allergen is retained. This route of allergen modification has been chosen by some manufacturers of allergen vaccines to develop commercially available products based on this principle.

However, there is still an interest in finding further methods for obtaining safe and efficacious medicaments for use in the immunotherapy of allergic disorders by optimising the allergen purification process to ensure that low molecular weight proteins, irritants and toxic components are eliminated.

SUMMARY OF THE INVENTION

The inventors have found that depigmenting an allergen extract using a base increases protein content and can also increase the major allergen content and the biological potency of the extract.

According to a first aspect of the present invention, there is provided a process for producing a depigmented allergen extract comprising:
 a) basifying a native allergen extract; and
 b) removing molecules having a molecular size of less than 3.5 kDa; and c) adjusting the pH to neutrality;
thereby to produce a depigmented allergen extract.

The process may further comprise a polymerisation step, comprising:
d) contacting a depigmented allergen extract with an aldehyde; and
e) removing molecules having a molecular size of less than 100 kDa;
thereby to produce a depigmented polymerised allergen extract.

According to a second aspect of the invention, there is provided a depigmented allergen extract obtainable according to the process of the first aspect of the present invention.

According to a third aspect of the invention, there is provided a depigmented polymerised allergen extract obtainable according to the process of the first aspect of the present invention.

According to a further aspect of the invention, there is provided a purified allergen extract for use as an active therapeutic substance in the treatment of allergy.

Definitions

"Allergen" can be defined as a molecule capable of inducing an IgE response and/or a Type I allergic reaction.

The term "native allergen extract" means an allergen extract which has been extracted from a source material and then treated to remove unbound low molecular weight components.

The term "depigmented allergen extract" referred to herein can be defined as a semi-purified allergen extract obtained from a native allergen extract by removal of allergenically irrelevant substances bound to the allergen protein including the adsorbed pigments.

The term "depigmented polymerised allergen extract" referred to herein can be defined as a purified allergen extract where protein bands <100 kDa are not detectable by non-reducing SDS-PAGE, and is obtained by polymerising a depigmented allergen extract.

DETAILED DESCRIPTION OF THE INVENTION

The allergen extracts of the invention are derived from any source material comprising natural allergens known to illicit an IgE mediated immune reaction in an individual. Such allergens may include air-borne allergens (e.g. pollen from grass, trees, herbs and weeds, dust mites, fungi and moulds), food allergens (e.g. peanuts), insect allergens (e.g. from cockroaches and fleas, and bee and wasp venom) and epithelial allergens (animal hair and animal dander, for example cat and dog dander).

The source material may be any allergen, including food allergens (e.g. peanuts), air-borne allergens (e.g. pollen (such as tree pollen, weed pollen, grass pollen, and cereal pollen), dust mites, fungi, and moulds), epithelial allergens (animal hair and animal dander, for example cat hair and dander, and dog hair and dander) and insect allergens (e.g. from cockroaches and fleas, and bee and wasp venom).

Pollen allergens from trees, grasses and weeds derive from the taxonomic order group of Fagales (e.g. *Alnus* and *Betula*), Lamiales (e.g. *Olea* and *Plantago*), Poales (e.g. *Phleum pratense*), Asterales (e.g. *Ambrosia* and *Artemisia*), Cayophyllales (e.g. *Chenopodium* and *Salsola*), Rosales (e.g. *Parietaria*), Proteales (e.g. *Platanus*), etc. Dust mites belong to the order group of Astigmata (e.g. *Dermatophagoides* and *Euroglyphus*). Airborne allergens derived from moulds and fungi belong to the order Pleosporales (e.g. *Alternaria*), Capnodiales (e.g. *Cladosporium*), etc.

Air borne allergens may be selected from the groups: tree pollen (*Alnus glutinosa, Betula alba, Corylus avellana, Cupressus arizonica, Olea europaea, Platanus* sp), grass pollen (*Cynodon dactylon, Dactylis glomerata, Festuca elatior, Holcus lanatus, Lolium perenne, Phleum pratense, Phragmites communis, Poa pratensis*), weed pollen (*Ambrosia elatior, Artemisia vulgaris, Chenopodium album, Parietaria judaica, Plantago lanceolata, Salsola kali*) and cereal pollen (*Avena sativa, Hordeum vulgare, Secale cereale, Triticum aestivum, Zea mays*), dust mites (*Dermatophagoides farinae, Dermatophagoides microceras, Dermatophagoides pteronyssinus, Euroglyphus maynei*), storage mites (*Acarus siro, Blomia tropicalis, Lepidoglyphus destructor, Tyrophagus putrescentiae, Glycyphagus domesticus, Chortoglyphus arcuatus*) and fungi and moulds (*Alternaria alternata, Cladosporium herbarum, Aspergillus fumigatus*).

Epithelial allergens may be selected from any animal including cat hair and dander, dog hair and dander, horse hair and dander, human hair and dander, rabbit hair and dander, rat hair and dander, mouse hair and dander, guinea pig hair and dander and feathers.

Arthropod allergens may be selected from insects, for example, ant, flea, cockroach, wasp and bee venom, or mites (*Acarus siro, Blomia tropicalis, Dermatophagoides farinae, Dermatophagoides microceras, Dermatophagoides pteronyssinus, Euroglyphus maynei, Lepidoglyphus destructor, Tyrophagus putrescentiae* and *Chortoglyphus arcuatus*).

Pollen allergens respond particularly well to base treatment. Pollen allergens include tree pollen, weed pollen, grass pollen and cereal pollen and are derived from the taxonomic order group of Fagales (e.g. *Alnus* and *Betula*), Lamiales (e.g. *Olea* and *Plantago*), Poales (e.g. *Phleum pratense*), Asterales (e.g. *Ambrosia* and *Artemisia*), Cayophyllales (e.g. *Chenopodium* and *Salsola*), Rosales (e.g. *Parietaria*), Proteales (e.g. *Platanus*) and the like.

In one embodiment, the allergen extract is derived from a source material which is a pollen. The pollen may be selected from *Phleum pratense, Olea europaea* and *Betula alba (pendula)*.

More preferably, the source material is selected from peanut (*Arachis hypogaea*), pollen (*Phleum pratense, Olea europaea* and *Betula alba (pendula)*), mites (*Dermatophagoides pteronyssinus*), and epithelial (cat dander).

In a preferred embodiment of the invention, the source material is selected from pollen (*Phleum pratense, Olea europaea* and *Betula alba (pendula)*) and mites (*Dermatophagoides pteronyssinus*).

More particularly, the source material is selected from *Phleum pratense, Olea europaea* and *Betula alba (pendula)*.

In a more preferred embodiment of the invention, the source material is *Phleum pratense*.

Alternatively, the source material is *Olea europaea*.

Alternatively, the source material is *Dermatophagoides pteronyssinus*.

One method for preparing a native allergen extract will now be described, although it will be appreciated that other suitable methods for obtaining a native allergen extract will be known to the skilled person and could be used as a starting material in the depigmentation process of the present invention.

The process for obtaining a native allergen extract from a source material may comprise:
i) contacting the source material or first source material residue with a liquid allergen extraction agent to produce a second mixture of allergens dissolved in a liquid phase, and a solid phase comprising a second source material residue;

ii) subjecting the second mixture to a second separation step to isolate the allergens dissolved in the liquid phase, to produce a crude allergen extract;

iii) subjecting the crude allergen extract to a low molecular fraction removal step to remove molecules having a size of less than 1-10, preferably less than 3.5 kDa at 3-10 degrees centigrade;

iv) carrying out step iii) at 3-10 degrees centigrade until the allergen extract has a conductivity below 900 µS/cm, measured at room temperature, to obtain a native allergen extract;

The source material may first be treated to create a maximum surface area for contact with the liquid allergen extraction agent. The source material may be homogenised, blended, crushed, or powdered to produce a homogenous slurry for liquid extraction.

In certain instances, preliminary defatting steps are required which may comprise:

i) contacting the source material comprising an allergen with a liquid lipid extraction agent to produce a first mixture containing lipids dissolved in a liquid phase and a solid phase consisting of a first source material residue comprising allergens and proteins; and
- ii) subjecting the first mixture to a first separation step to isolate the first source material residue.

The preliminary defatting steps may be required in instances where the source material is pollen, epithelia or food, such as nuts, e.g. peanut. The lipid extraction, or "defatting" step, removes lipophilic compounds such as lipids and fatty acids from the source material.

The liquid lipid extraction agent may be acetone, ether, or a similar solvent, which may be cold. Preferably the liquid lipid extraction agent is acetone. The lipid extraction step may be performed in a ratio of 1:1 weight ratio of source material to liquid lipid extraction agent, or any ratio where the weight of the liquid lipid extraction agent exceeds the weight of the source material, for example 1:2, 1:3, 1:5, 1:10. The lipid extraction step is preferably performed at a ratio of 1 kg of source material to 2 L of liquid lipid extraction agent. The lipid extraction step is preferably performed for sufficient time for the lipids in the source material to dissolve in the liquid lipid extraction agent, which may be for over 1 minute, preferably over 5 minutes, more preferably over 30 minutes, and most preferably for 1 hour or more. The liquid extraction step may be performed at a temperature between 2 to 25 degrees centigrade, but is preferably performed cold at between 2 to 6 degrees centigrade, and more preferably between 3 to 5 degrees centigrade. During the lipid extraction step, the source material is preferably stirred or agitated with the liquid lipid extraction agent.

The first separation step may be any suitable separation step known to the skilled person, for example the first separation step may be filtration or any other suitable method.

After the first separation step, the source material residue may be washed with the liquid lipid extraction agent. Optionally, the first source material residue may be further extracted with the liquid lipid extraction agent, then separated. Preferably, one, two or more further lipid extraction steps are performed. Filtration of the liquid extraction agent may be repeated until it is transparent. Other suitable separation methods known to the skilled person may also be used.

After lipid extraction and separation, the source material residue may be dried. The source material residue may be dried at between 2 to 25 degrees centigrade, preferably at room temperature. The drying step is preferably continued for sufficient time to allow removal of the liquid lipid extraction agent from the source material residue, which may be between 1 to 24 hours, 6 to 18 hours, although drying is preferably for at least 12 hours.

Allergens may be obtained from the ("defatted") first source material residue by extraction with the liquid allergen extract agent to produce a crude allergen extract comprising allergens dissolved in a liquid phase and a solid phase consisting of "unwanted" non-allergenic residues. The liquid allergen extract agent may be an aqueous solution, and preferably comprises a buffering agent. The liquid allergen extraction agent may comprise PBS and/or NaCl, for example it may be an aqueous solution of 0.01 M PBS/0.15 M NaCl, or an aqueous solution of ammonium bicarbonate ($(NH_4)HCO_3$) and/or NaCl, for example an aqueous solution of 0.125 M $(NH_4)HCO_3$/0.15 M NaCl. The first source material residue may be extracted in the liquid allergen extract agent in any ratio where the weight of the liquid allergen extract agent exceeds the weight of the first source material residue, for example weight ratios of 1:2, 1:3, 1:5, 1:10, 1:20, 1:50, 1:80. Preferably, the first source material residue is extracted in the liquid allergen extract agent in a ratio of 1:10 by weight first source material residue:liquid allergen extract agent. The ratio of the first source material residue to liquid allergen extract agent may vary but should be such that the allergens in the first source material residue can dissolve in the liquid allergen extract agent. The extraction of the first source material residue with the liquid allergen extract agent is preferably performed for sufficient time for the allergens in the first source material residue to dissolve in the liquid allergen extraction agent, which may be for between 30 minutes to 12 hours, preferably between 1 to 6 hours, more preferably between 2 to 5 hours, and most preferably for around 4 hours. The allergen extraction step may be performed at between 2 to 25° C., but is preferably performed cold at between 2 to 6 degrees centigrade, and more preferably between 3 to 5 degrees centigrade. During the allergen extraction step, the first source material residue is preferably stirred or agitated with the liquid allergen extraction agent.

After the allergen extraction step, the allergens dissolved in the liquid phase may be separated from the second source material residue, to produce a crude allergen extract. The separation step is preferably centrifugation, although many techniques to separate solid from liquid are applicable, these being well known to a person skilled in the art. Preferably, the allergens dissolved in the liquid phase are centrifuged at between 2 to 6 degrees centigrade, and preferably between 3 to 5 degrees centigrade, for sufficient time to sediment the source material residue as a pellet, for example between 1 minute to 1 hour, or over 1 hour. The crude allergen extract (i.e. the supernatant containing the dissolved allergens) may be stored at between 2 to 6 degrees centigrade. The second source material residue pellet may be further extracted with the liquid allergen extract agent using the same conditions as the first allergen extraction step, and preferably for a longer extraction period such as between 4 to 8 hours, 8 to 12 hours, or over 12 hours. After the second allergen extraction step, the allergens dissolved in the liquid phase may be separated from the second source material residue to produce a crude allergen extract. The crude allergen extracts from the first and second allergen extraction steps are preferably pooled for further treatment.

The crude allergen extract may be filtered, for example using 0.45 μm pore size. The crude allergen extract may be subjected to a low molecular fraction removal step to remove molecules having a low molecular size such as salts and other non-allergenic compounds. In step iii) molecules having a molecular size of less than 1-10, preferably less than 3.5 kDa may be removed. The low molecular fraction removal step is preferably continued at 3-10, preferably 3-5° C. until the conductivity of the allergen extract is less than 900 μS/cm, or less than 800 μS/cm, or less than 700 μS/cm, or less than 600 μS/cm, or more preferably less than 500 μS/cm (measured at room temperature).

The resulting native allergen extract may be filtered, for example using 0.45 and/or 0.22 μm pore size.

The native allergen extract may be used in the preparation of a pharmaceutical composition or vaccine for standardisation, diagnosis, synthesis and vaccination purposes.

In the present invention, the native allergen extract is used as the starting material in the depigmentation method described herein.

The present invention provides a depigmentation method comprising a basifying treatment, wherein non-allergenic compounds adhering to the allergens/proteins are removed using means which disrupt electrostatic, hydrophobic or other physical forces being responsible for the adherence of the non-allergenic compounds to the proteins, to produce a depigmented extract.

The basifying treatment comprises:
a) basifying the native allergen extract;
b) removing molecules having a molecular size of less than 3.5 kDa; and
c) adjusting the pH to neutrality to produce a depigmented allergen extract.

The basifying treatment comprises either mild base treatment or strong base treatment. In the base treatment the pH of the allergens/proteins may be increased to at least pH 7, for example a pH value of between 7 and 11. The preferred pH of the allergen proteins is between 7 and 10, more preferred is a pH between 7 and 8. A pH value of greater than 11 may lead to the protein profile of the depigmented allergen extract being incomplete, and a neutral pH, for example pH 6, leads to incomplete elimination of the non-allergenic compounds in the resulting depigmented allergen extract.

In one embodiment, the base treatment comprises basifying the allergen extract to pH 7, pH 8, pH 9, pH 10 or pH 11.

In one embodiment, the base treatment comprises basifying the allergen extract to pH 7 to 11, or pH 7 to 10, preferably between pH 7 and 8.

The pH of the native allergen extract may be increased using any suitable base. The base may be a strong base or a weak base. Strong bases include sodium hydroxide, lithium hydroxide and potassium hydroxide. Weak bases include urea, ammonium hydroxide and methylamine. In one embodiment the base is selected from the list comprising sodium hydroxide, lithium hydroxide, potassium hydroxide, urea, ammonium hydroxide or methylamine. In particular, the base is sodium hydroxide.

The basified extract may be maintained at a basic pH for 1 minute to 24 hours, 1 minute to 4 hours, 1 to 60 minutes, preferably 5 to 30 minutes, more preferably 10 to 20 minutes, and most preferably around 15 minutes.

Molecules having a molecular size of less than 3.5 kDa may be removed in a low molecular fraction removal step.

After the basifying treatment, the resulting depigmented allergen extract may be collected, and the pH of the extract adjusted using a suitable acid, for example HCl. The pH may be adjusted to a value where precipitation of the proteins is avoided, for example between pH 7.0 and 7.5, more particularly between pH 7.3 and 7.4.

In particular, the basifying treatment may comprise:
a) basifying the native allergen extract to pH 7 to 11 and maintaining the basified extract for 1 minute to 24 hours, for example, 5 to 30 minutes, preferably 15 minutes;
b) subjecting the extract to a low molecular fraction removal step to remove molecules having a molecular size of less than 3.5 kDa; and
c) adjusting the pH to between 7.0 and 7.5, in particular 7.3 to 7.4, to produce a depigmented allergen extract.

The basifying treatment may comprise basifying the native allergen extract to pH 7 to 10.

The low molecular fraction removal step may be a dialysis step, where the extract is dialysed against a dialysate such as purified water or a buffer. The low molecular fraction removal step may be performed at between 2-25 degrees centigrade, but is preferably performed cold at between 2-6 degrees centigrade, and most preferably between 3-5 degrees centigrade. The low molecular fraction removal step may be performed for 12-24 hours, where the solvent, or in the case of dialysis, the dialysate, is regularly changed to maintain the reaction.

The resulting depigmented allergen extract may be filtered, for example using a 0.45 μm and/or 0.22 μm pore size, and may be frozen or freeze dried for storage.

The extracts produced using the process of the present invention can be further treated. The process may further comprise a polymerisation step, comprising:
d) contacting a depigmented allergen extract with an aldehyde, and after polymerization,
e) removing molecules having a molecular size of less than 100 kDa.

The aldehyde may be any suitable aldehyde, for example glutaraldehyde or formaldehyde.

The polymerisation step may comprise:
d) contacting a depigmented allergen extract with glutaraldehyde or formaldehyde,
e) subjecting the extract to a molecular fraction removal step to remove molecules having a molecular size of less than 100 kDa, and
f) carrying out step e) at 3-15, preferably 3-5 degrees centigrade until the allergen extract has a conductivity of below 210 μS/cm (measured at room temperature) and/or until the extract is absent of glutaraldehyde, to obtain a depigmented polymerised allergen extract.

Where the extract for polymerisation is freeze-dried, it may be reconstituted in a buffer, for example 0.01M PBS/0.15M NaCl, to a final concentration of 0.1-500 mg/ml, preferably 1-100 mg/ml, and most preferably 10-50 mg/ml.

The polymerisation reaction is preferably performed to completion, such that protein bands <100 kDa (e.g. 14-25 kDa) are not detectable by non-reducing SDS-PAGE in the depigmented polymerised allergen extract.

Increasing concentrations of glutaraldehyde may decrease polymer yield and increase residue yield obtained by any centrifugation step before dialysis. In contrast to previously known polymerisation conditions employing a glutaraldehyde concentration of around 5 mg/ml (i.e. 0.009 ml glutaraldehyde per ml of allergen extract), the optimal glutaraldehyde concentration was experimentally determined to be approximately double that of the known amount for some allergens (peanut, cat epithelia and *Ambrosia*), i.e. 10 mg/ml (0.02 ml glutaraldehyde per ml of allergen extract). The aldehyde may be added in a range of 1-20 mg/ml. Whilst employing previously known amounts of a final concentration of glutaraldehyde can lead to some polymerisation of the allergens, it is preferred that the aldehyde is added at a final concentration of 5-10 mg/ml or in a ratio of 0.01-0.02 ml glutaraldehyde per ml of extract to achieve optimal polymerisation. Decreasing the addition rate of glutaraldehyde may also decrease polymer yield and increase residue yield. The aldehyde may be added to the extract at a constant speed, for example between 0.001-0.5 ml per minute (1-500 µl/min or 60-3000 µl/hour).

The polymerisation reaction may be maintained for between 1-12 hours, preferably 7 hours at room temperature or higher. The polymerisation reaction may be stopped using glycine in a proportion of 40 mg per ml of depigmented polymerised allergen extract solution. The stopped reaction may be maintained overnight at 3-5° C., preferably under stirring. The depigmented polymerised allergens in the liquid phase may be separated from insoluble residue to produce a depigmented polymerised allergen extract. The separation step is preferably centrifugation, although many separation techniques are applicable, these being well known to a person skilled in the art. Preferably, the extract is centrifuged at between 2-6 degrees centigrade, and preferably between 3-5 degrees centigrade, for sufficient time to sediment the insoluble residue as a pellet, for example between 1 minute to 1 hour, or over 1 hour. The supernatant (containing the soluble depigmented polymerised allergens) may be collected and subjected to a molecular fraction removal step e).

In step e) molecules having a molecular size of less than 100 kDa are removed.

Preferably the molecular fraction removal step is a dialysis step, where the extract is dialysed against a dialysate such as purified water or a buffer, at 3-15, preferably 3-5 degrees centigrade. The molecular fraction removal step may be continued at 3-15, preferably 3-5 degrees centigrade until the conductivity measured at room temperature is less than 300 µS/cm, more preferably less than 250 µS/cm, most preferably less than 210 µS/cm.

The resulting depigmented polymerised allergen extract may be filtered, for example using 0.45 µm and/or 0.22 µm pore size, and may be frozen or freeze dried for storage.

Any of low molecular fraction removal steps described herein, for example steps b) or e), may comprise an ultrafiltration step, a diafiltration step, a dialysis step, or filtration.

In its simplest form the process of the present invention may comprise preparing or obtaining a native allergen extract and basifying the extract, for example, via mild or strong base treatment, to remove non-allergenic compounds having a low molecular size. The extract may then be polymerised using an aldehyde. The native allergen extract may be peanut, pollen, grass, epithelial, mould, fungi, insect or mite allergens, in particular grass, pollen or mite, more particularly pollen allergens. The process of the present invention yields an allergen extract which exhibits reduced IgE binding capacity but which retains its immunogenic capacity.

The present invention further comprises a treatment for allergy and a diagnostic drug for allergy, both comprising allergen extracts produced by the processes of the present invention, as the active ingredient. The allergy may be associated with exposure to various allergens which illicit an IgE mediated allergic response as discussed herein.

According to a second aspect of the present invention there is provided a depigmented allergen extract obtainable according to the process of the first aspect of the present invention.

According to a third aspect of the present invention there is provided a depigmented polymerised allergen extract obtainable according to the process of the first aspect of the present invention. There is provided a purified allergen extract for use as an active therapeutic substance.

The allergen extract may be selected from peanut (*Arachis hypogaea*), pollen (*Phleum pratense, Betula alba Olea europaea, Parietaria judaica*, and *Cupressus arizonica*), mites (*Dermatophagoides pteronyssinus*), and epithelial (cat dander). In particular the allergen extract is pollen selected from *Olea europaea* and *Phleum pratense*.

The allergen extract may be for use in the treatment of allergy. In a preferred embodiment the allergen extract of *Olea europaea* or *Phleum pratense* may be for use in the treatment of pollen allergy.

The depigmented polymerised allergen extract may be characterised by the following physicochemical and biological properties:
  i. Soluble in water,
  ii. Absence of non-polymerised allergens/proteins with a molecular weight lower than 100 kDa (identified as bands by SDS-PAGE in non-reducing conditions)
  iii. Absence of IgE recognition bands with a molecular weight lower than 100 kDa (identified by immunoblot in non-reducing conditions)
  iv. Absence of polymerised molecules with a molecular weight lower than 100 kDa (determined by SDS PAGE)
  v. Reduction of the biological potency (95%) with respect to the native allergen extract (determined by IgE ELISA inhibition experiments using a specific pool of sera from sensitized individuals) and
  vi. Absence of abnormal toxicity in mice and guinea pigs.

In particular, the depigmented polymerised allergen extract is characterised by a reduction of the biological potency (95%) with respect to the native allergen extract (determined by IgE ELISA competition experiments using a specific pool of sera from sensitized individuals).

The allergen extracts of the present invention may be for use as an active component of a medicament for the treatment of an allergic individual, with the aim of inducing tolerance to certain allergens.

There is provided the use of an allergen extract according to the present invention in diagnostics for immunological disorders, preferably to detect allergic disease. There is provided the use of an allergen extract according to the present invention for the treatment of allergy or in the manufacture of a medicament for the treatment of allergy, for example pollen allergy. The use may be for immunotherapy. The use may be for standardisation, diagnosis, synthesis and vaccination purposes. The use may be in therapeutic treatment of patients, preferably in immunotherapy. The use may be in monitoring the patients during immunotherapy.

Alternatively, there is provided a method for treating a person in need thereof for allergy, such as pollen allergy, comprising the step of administering to the person in need thereof the allergen extracts of the invention.

According to a further aspect of the present invention there is provided a pharmaceutical composition comprising an allergen extract according to the present invention. There is provided a pharmaceutical composition for the treatment of allergy which comprises as the active ingredient a pharmaceutically effective amount of an allergen extract according to the present invention and at least one pharmaceutically acceptable carrier or diluent. There is provided a diagnostic composition for allergy which comprises as the active ingredient a diagnostically effective amount of an allergen extract according to the present invention.

According to a further aspect of the present invention there is provided a vaccine comprising an allergen extract according to the present invention. The pharmaceutical composition and vaccine may further comprise one or more adjuvants, diluents, preservatives or mixtures thereof. The pharmaceutical composition or vaccine may comprise a physiologically acceptable carrier. As used herein, the phrase "pharmaceutically acceptable" preferably means approved by a regulatory agency of a government, or listed in the European or US. Pharmacopeia or another generally recognized pharmacopeia for use in humans.

Such pharmaceutically acceptable carriers can be sterile liquids, such as water and oils, including those of petroleum, animal, vegetable or synthetic origin, such as peanut oil, soybean oil, mineral oil, sesame oil and the like. Saline solutions and aqueous dextrose and glycerol solutions can also be employed as liquid carriers, particularly for injectable solutions. Suitable pharmaceutical excipients include mannitol, human serum albumin (HSA), starch, glucose, lactose, sucrose, gelatin, malt, rice, flour, chalk, silica gel, magnesium carbonate, magnesium stearate, sodium stearate, glycerol monostearate, talc, sodium chloride, dried skim milk, glycerol, propylene, glycol, water, ethanol and the like.

There is provided a vaccine obtainable according to the process of the first aspect of the present invention. The vaccine may be for sub-cutaneous or sub-lingual use or epicutaneous.

There is provided the use of a vaccine according to the present invention in the treatment of allergy, or in the manufacture of a medicament for the treatment of allergy.

According to a further aspect of the present invention there is provided a method of preventing an allergen sensitisation comprising the step of: exposing an individual to an effective amount of an allergen extract, the pharmaceutical composition or the vaccine of the present invention.

According to a further aspect of the present invention there is provided a method of treating an allergy in a sensitised individual, comprising administering to the individual an effective amount of an allergen extract, the pharmaceutical composition or the vaccine of the present invention. The allergen extract, the pharmaceutical composition or the vaccine may be administered subcutaneously, or sub-lingually, and may be administered as an increasing or constant dosage.

The individual may be a human or an animal, preferably a human.

Figure 1:
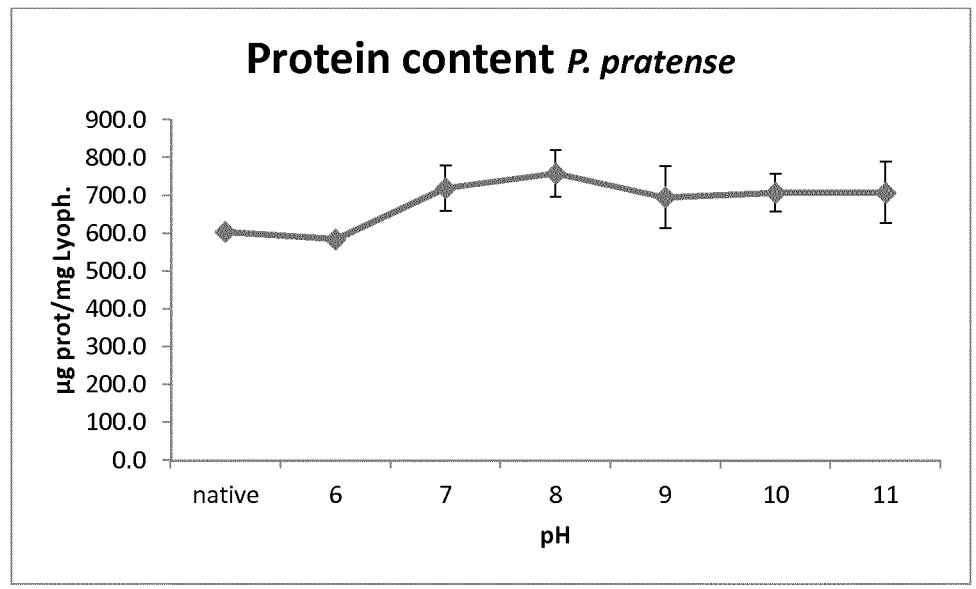
FIG. 1 shows protein content of *P. pratense* extracts (determined using Lowry-Biuret method) of lyophilized samples obtained after different pH treatments. Error bars refer to the standard deviation of different samples' mean value.

The present invention is illustrated by the following examples which detail processes for the preparation, purification and basification of extracts comprising allergens.

Methods A-C detail the processes used to make the allergen extracts.

Methods

A. Optional Defatting Process of Raw Allergen Material

Defatted extract was obtained. In general, homogenised material was defatted in acetone at 3-5° C., and filtered. This step was repeated until the acetone was transparent. The defatted material was recovered and dried at room temperature until all the acetone had been removed.

B. Preparation of Native Allergen Extract

Dried defatted material was weighed and extracted in 0.01 M PBS/0.15M NaCl in a proportion 1:10 for 4 hours at 3-5° C. under magnetic stirring. Afterwards, the solution was centrifuged for 30 minutes at 4° C. at 10.000 r.p.m. The resulting supernatant was collected and stored at 3-5° C. and the pellet was reconstituted in 0.01 M/NaCl 0.15M (1:10) and extracted overnight at 3-5° C. under magnetic stirring. The solution was centrifuged for 30 minutes at 3-5° C. at 10.000 r.p.m and the supernatant was collected and mixed with the previously obtained fraction. The combined extract was filtered using 0.45 µm pore size and extensively dialyzed in 3 kDa cut-off dialysis membranes until the conductivity was lower than 500 µS/cm. The extract was then filter sterilized using 0.22 µm pore size.

C. Preparation of Depigmented Allergen Extract

Native extract in aqueous solution and maintained at 3-5° C. was further treated using the following procedure. Under magnetic stirring, the pH of the solution was adjusted to pH 7-11 by addition of sodium hydroxide, lithium hydroxide, potassium hydroxide, urea, ammonium hydroxide or methylamine and maintained under these conditions for 15 minutes. Afterwards the extract was dialyzed in 3.5 kDa cut-off dialysis membranes with purified water for approximately 17 hours against 10 volumes of purified water at 3-5° C. Purified water was substituted 4 times during this period. After the base treatment, the extract was collected and the pH adjusted to 7.3-7.4 using 0.1M HCl. Finally the extract was sterile filtered until 0.22 µm, frozen and freeze-dried.

Immunological Characterisation

Protein Content

The protein content of native and depigmented extracts was measured by the Lowry Biuret method following the manufacturer's instructions.

Sodium Dodecyl Sulfate Polyacrylamide Gel Electrophoresis (SDS-PAGE)

Protein profiles were identified by SDS-PAGE under reducing conditions (samples incubated with β-mercaptoethanol and heated for 10 minutes at 95° C.) in 2.67% C, 15% T acrylamide-acrylamide gels. Samples and Low Molecular Weight Standard (BioRad Laboratories, Hercules, CA, USA) were run in the same gel. Gels were stained with 0.1% Coomassie Brilliant Blue R-250 (BioRad).

Immuno-Blot

Electrophoretically separated proteins (by SDS-PAGE) were transferred to a PVDF membrane (Trans-Blot® Turbo™ Transfer Pack, BioRad) and incubated overnight with sera from patients sensitized to each allergen (Plasmalab International, Everett, WA, USA) diluted in 0.01M Phosphate Buffer Solution (PBS)-0.1% Tween. Plasmalab International operates in full compliance with Food and Drug Administration regulations. Specific IgE binding to the extract was detected with peroxidase-conjugated monoclonal antibodies, antihuman-IgE-PO (Ingenasa, Madrid, Spain), developed with luminol solutions (Western ImmunStar™ Western CTM Kit, Bio-Rad) and detected by chemiluminescence (ChemiDoc XRS, Bio-Rad).

Major Allergen Quantification

Major allergens were quantified using ELISA sandwich method using enzyme-linked immunosorbent assay detection kits (Indoor Biotechnologies, VA, USA). Briefly, Nunc Maxisorp plates (Thermo Scientific, Waltham, MA, USA) were coated with a specific monoclonal antibody diluted in carbonate/bicarbonate buffer (pH=9.6) and incubated overnight at 4° C. Afterwards, plates were blocked with BSA 1% in PBS 0.01 M-Tween 0.05%. Then, samples and standard were added in serial one half dilutions with BSA 1% in PBS 0.01 M-Tween 0.05%. Specific secondary monoclonal antibody (biotinylated) was added and streptavidin was finally used. Reaction with development solution (chromogen) was measured at OD 450 nm after stopping with sulfuric acid. Standard curve was obtained using a 4-parameters logistic fit by the least-squares method, where samples concentrations were interpolated to obtain the results.

ELISA Competition (IgE)

Native and depigmented extracts' capacity to inhibit IgE binding to each in-house reference preparation (IHRP) biologically standardized was compared. Nunc plates (Thermo Scientific) were coated with anti-IgE. A pool of serum from patients sensitized to the allergen was incubated in the plate. Dilutions of the sample and IHRP were incubated with the allergen labelled with peroxidase. The mixture was added to the coated plate and incubated. Afterwards, development solution (chromogen) was added, stopped with sulfuric acid and optical density (OD) measured at 450 nm.

ELISA Inhibition (IgE)

In vitro allergenic activity of the extracts (native and depigmented) was tested by means of ELISA inhibition, establishing the 50% inhibition point, using a native extract as reference. Plastic microtiter plates (Immulon 4HBX; Thermo Scientific) were coated with the native extract (10 µg of protein/ml) overnight. Serial 1:2 dilutions were made from the native and depigmented extracts in a Nunc F plate (Thermo Scientific). Each dilution was incubated with a serum pool for 2 hours at room temperature. Afterward, the dilutions of the extracts were transferred to the native coated plates and incubated for 2 hours. After washing, 100 µl of anti-human IgE peroxidase was added and let to stand for 30 minutes at room temperature. After washing, the plates were developed for 30 minutes (chromogen) and stopped with sulfuric acid (1 N).

Thin Layer Chromatography (TLC)

Plant flavonoids were used as positive controls. Controls and standards were applied over a TLC aluminium sheet silica gel 60F (Merck, Darmstadt, Germany). Ethyl-acetate: formic acid:acetic acid:water (100:11:11:27) was used as eluent, and developed using solution 1% methanolic diphenylboric acid-β-ethylamino ester followed by 5% ethanolic Poly(ethylene glycol)-4000.

EXAMPLES

Example 1: *Phleum pratense*

Depigmented *Phleum pratense* extract was obtained in accordance with method steps A to C.

Protein Content

Maximum protein content was obtained after treatment using methylammonium pH 8 (865 µg protein/mg lyophilized extract), and minimum content corresponds to potassium hydroxide pH 11 treatment (579 µg protein/mg lyophilized extract) (Table 1). Mean value across all pHs was 718 µg protein/mg lyophilized extract.

Figure 2:
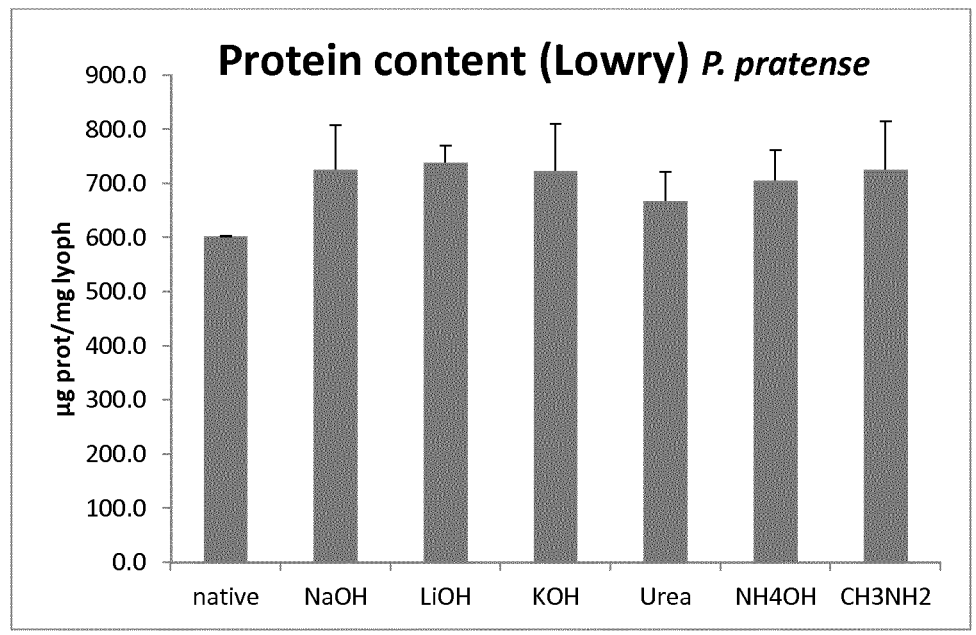
FIG. 2 shows protein content of *P. pratense* extracts (determined using Lowry-Biuret method) of lyophilized samples obtained after treatment with different bases. Error bars refer to the standard deviation of different samples' mean value.

The highest protein content corresponded to pH 8 treatments (mean value 758 µg prot/mg lyoph), and the lowest to pH 9 (694 µg prot/mg lyoph) (Table 2) (FIG. 2). The protein content at all pHs between 7 to 11 was higher than native extract and the sample at pH 6, which was the original pH of the sample (sample treated the same as the depigmented samples, but without the basifying pH change).

Regarding different bases used, the highest protein content was achieved using lithium hydroxide (739 µg prot/mg lyoph), and the lowest with urea (668 µg prot/mg lyoph) (Table 3, FIG. 2).

Major Allergen Quantification

The lowest level corresponded to ammonium hydroxide treatment at pH 10 (13.0 µg Phl p 5/mg lyophilized extract) (Table 1). The highest levels corresponded to lithium hydroxide treatment at pH 8, followed by ammonium hydroxide treatment at pH 11 (41.0 and 38.0 µg Phl p 5/mg lyophilized extract, respectively). Mean depigmented value was 26.6 µg Phl p 5/mg lyophilized extract.

Figure 3:
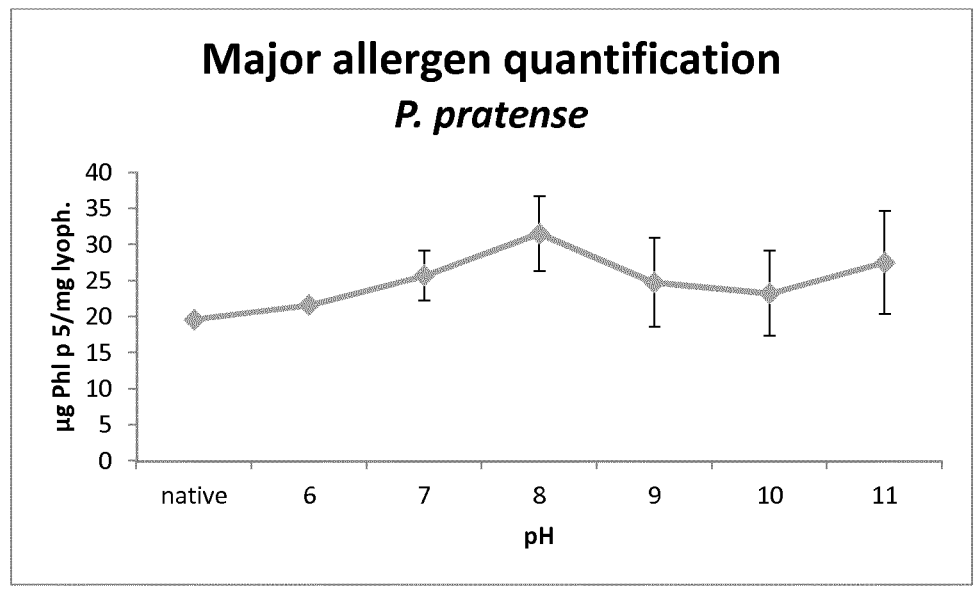
FIG. 3 shows Phl p 5 (*Phleum* major allergen) content of lyophilized samples obtained after different pH treatments. Error bars refer to the standard deviation of different samples' mean value.

The highest major allergen content was obtained in treatments at pH 8 (31.5 µg Phl p 5/mg lyophilized extract) and the lowest at pH 10 (23.2 µg Phl p 5/mg lyophilized extract) (FIG. 3, Table 2). However, all treatments with bases yielded higher major allergen content than native extract and sample at pH 6 (without treatment).

Figure 4:
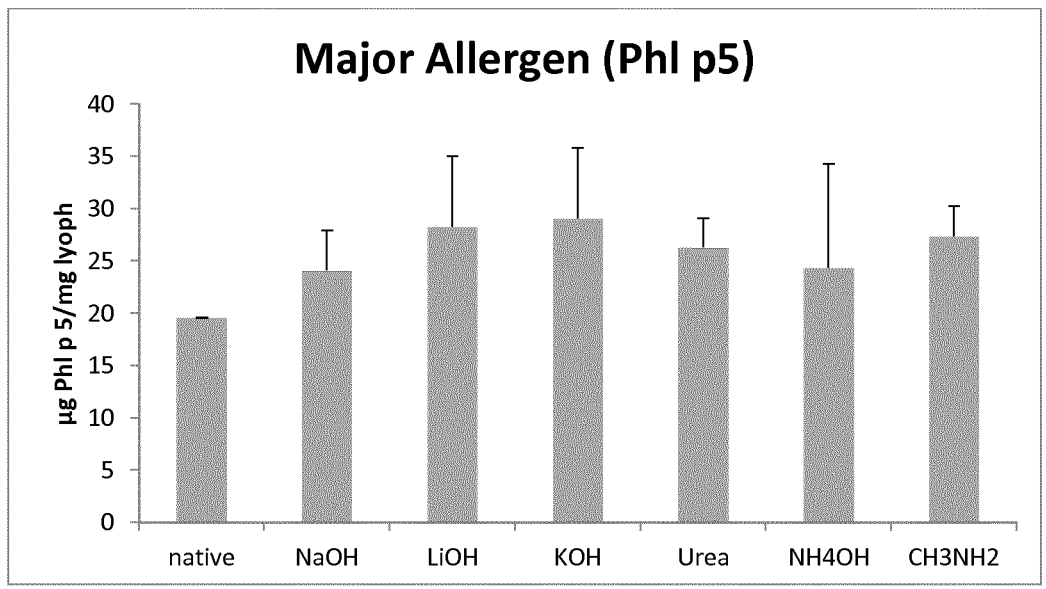
FIG. 4 shows Phl p 5 (*Phleum* major allergen) content of lyophilized samples obtained after treatment with different bases. Error bars refer to the standard deviation of different samples' mean value.

The lowest major allergen content was obtained in treatments using sodium hydroxide (24.1 µg Phl p 5/mg lyophilized extract), and the highest using potassium hydroxide (29.1 µg Phl p 5/mg lyophilized extract) (FIG. 4, Table 3).

ELISA Competition (IgE)—Biological Potency

Figure 5:
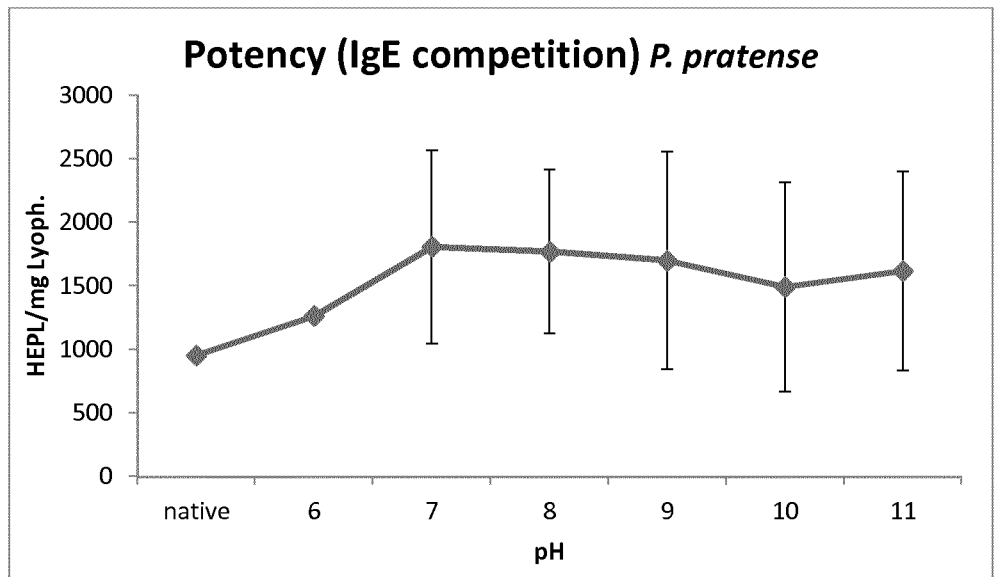
FIG. 5 shows biological potency (ELISA competition) of *P. pratense* extracts of lyophilized samples obtained after different pH treatments. Error bars refer to the standard deviation of different samples' mean value.
Figure 6:
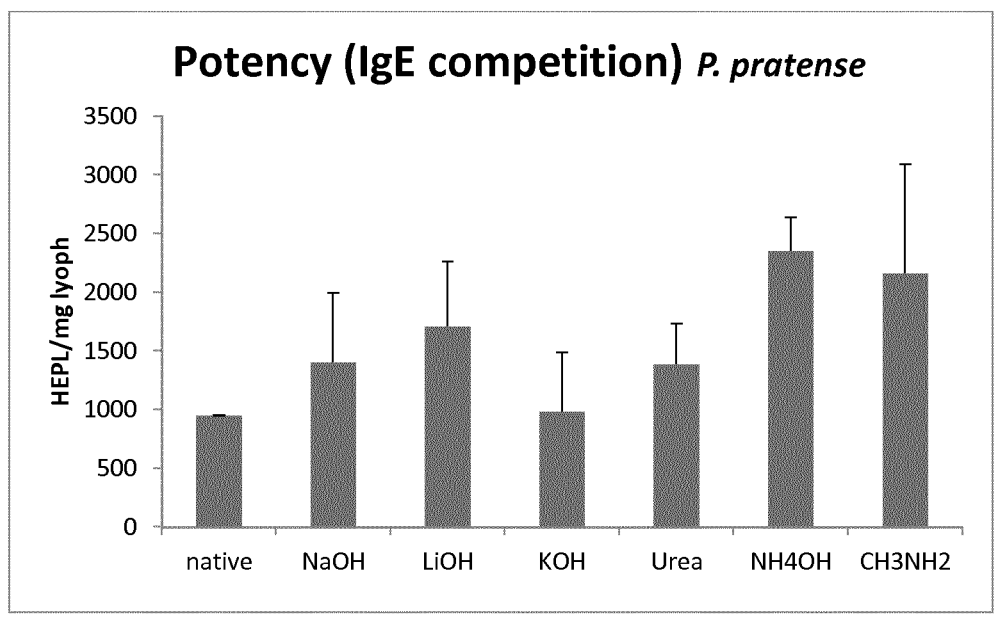
FIG. 6 shows biological potency (ELISA competition) of *P. pratense* extracts of lyophilized samples obtained after treatment with different bases. Error bars refer to the standard deviation of different samples' mean value.

The highest biological potency corresponded to samples treated with methyl ammonium pH 7 and 9 (3052 and 2909 HEPL/mg lyophilized extract, respectively) (FIGS. 5 and 6, Table 1). The lowest value corresponds to treatments with potassium hydroxide (mean value of 984 HEPL/mg lyophilized extract), similar to native extract (952 HEPL/mg) (Table 3). Differences could be detected between ammonium hydroxide and other groups (potassium hydroxide $P=0.010$, Tukey Test; urea $P=0.005$, sodium hydroxide $P=0.012$, lithium hydroxide $P=0.049$, Mann-Whitney), except for methylamine. There were also differences between methylamine and potassium hydroxide. Mean value of depigmented samples was 1685 HEPL/mg lyophilized extract, higher than results obtained with native extract and sample at pH 6 (without treatment) (952 and 1262 HEPL/mg lyophilized extract, respectively).

ELISA Inhibition (IgE)

Micrograms of lyophilized µg necessary to reach 50% inhibition did not show correlation with HEPL/mg values (Pearson Product Moment Correlation, $P>0.050$).

Figure 7:
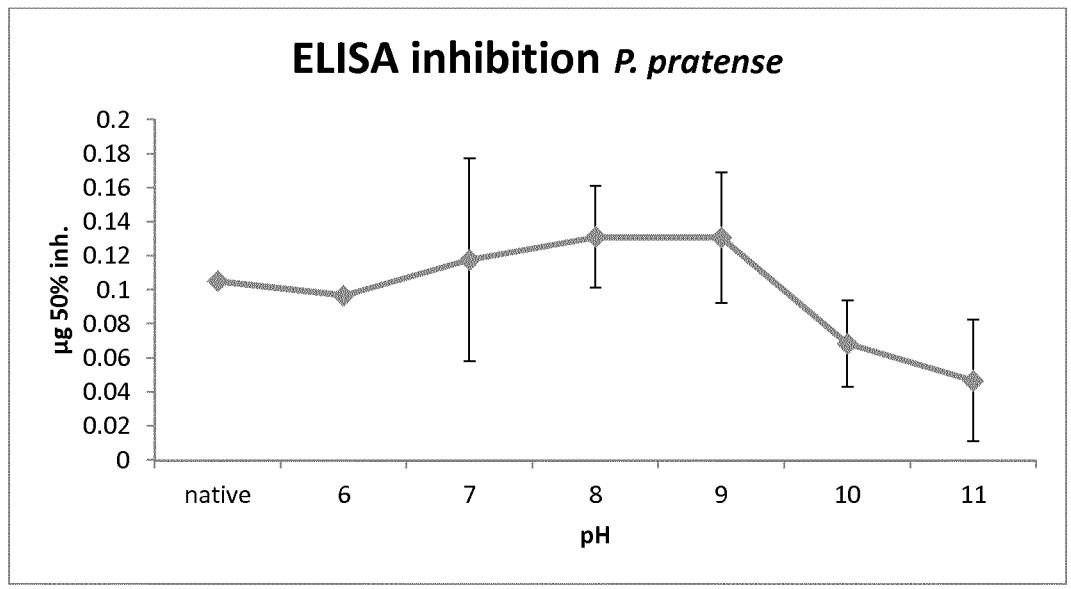
FIG. 7 shows µg necessary to obtain 50% inhibition of IgE binding to native extract of *P. pratense* extracts of lyophilized samples obtained after different pH treatments. Error bars refer to the standard deviation of different samples' mean value.

50% inhibition values at pH 8 were significantly higher than treatments at pH 11 and 10 ($P=0.030$ and $P=0.017$, respectively, Mann-Whitney Rank Sum Test) (FIG. 7, Table 2). The lowest value corresponded to potassium hydroxide at pH 11 (0.007 µg), followed by ammonium hydroxide at pH 11 (0.020 µg, respectively) (Table 1). Mean value was 0.102 µg, similar to native extract and sample at pH 6 (0.105 and 0.097 µg, respectively).

Figure 8:
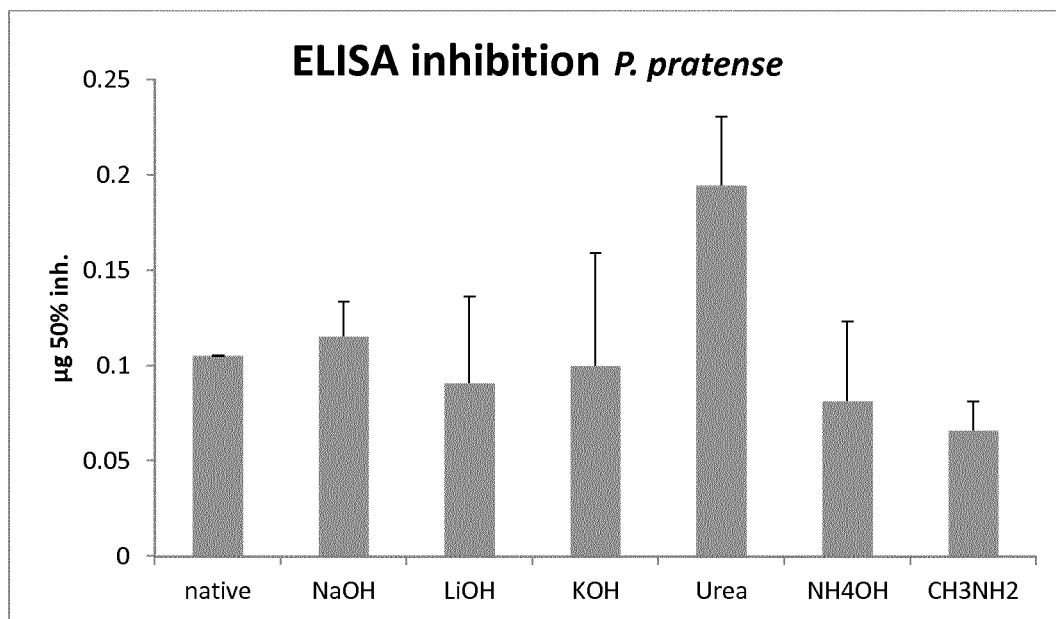
FIG. 8 shows µg necessary to obtain 50% inhibition of IgE binding to native extract of *P. pratense* extracts of lyophilized samples obtained after treatment with different bases. Error bars refer to the standard deviation of different samples' mean value.

Regarding the base used, the highest 50% inhibition values corresponded to treatments with urea (mean of 0.195 µg) (FIG. 8, Table 3). The lowest values were observed in methylamine treatment (mean value of 0.066 µg). Differences were detected between urea treatments and methylamine, ammonium hydroxide, lithium hydroxide, potassium hydroxide and sodium hydroxide.

Table of Individual Results

TABLE NO 1

| | Individual data | | | |
|---|---|---|---|---|
| Samples | µg prot/ mg lyoph. | µg Phl p 5/ mg lyoph. | HEPL/mg | µg 50% inh. |
| Native | 603.0 | 19.6 | 952.4 | 0.105 |
| W/O treat. pH 6 | 584.0 | 21.6 | 1261.9 | 0.097 |
| pH 7 NaOH | 795.3 | 21.2 | 765.0 | 0.116 |
| pH 8 NaOH | 764.3 | 25.8 | 1134.0 | 0.117 |
| pH 9 NaOH | 587.0 | 19.0 | 1055.1 | 0.144 |
| pH 10 NaOH | 755.0 | 27.2 | 2149.1 | 0.101 |
| pH 11 NaOH | 726.3 | 27.3 | 1902.0 | 0.099 |
| pH 7 LiOH | 724.3 | 26.6 | 1988.0 | 0.089 |
| pH 8 LiOH | 773.0 | 40.1 | 2538.0 | 0.131 |

TABLE NO 1-continued

Individual data

| Samples | µg prot/ mg lyoph. | µg PhI p 5/ mg lyoph. | HEPL/mg | µg 50% inh. |
|---|---|---|---|---|
| pH 9 LiOH | 753.0 | 26.2 | 1407.9 | 0.141 |
| pH 10 LiOH | 749.5 | 23.7 | 1441.4 | 0.040 |
| pH 11 LiOH | 693.0 | 24.9 | 1164.0 | 0.054 |
| pH 7 KOH | 776.0 | 31.5 | 1771.4 | 0.110 |
| pH 8 KOH | 751.5 | 34.7 | 933.5 | 0.158 |
| pH 9 KOH | 797.5 | 33.7 | 1098.0 | 0.140 |
| pH 10 KOH | 711.0 | 27.3 | 642.8 | 0.085 |
| pH 11 KOH | 578.5 | 18.2 | 475.6 | 0.007 |
| pH 7 Urea | 706.5 | 23.7 | 1355.7 | 0.235 |
| pH 8 urea | 689.5 | 29.2 | 1744.0 | 0.168 |
| pH 9 urea | 608.0 | 26.0 | 1053.6 | 0.182 |
| pH 7 NH4OH | 645.0 | 26.4 | 1897.3 | 0.081 |
| pH 8 NH4OH | 706.0 | 28.0 | 2378.3 | 0.129 |
| pH 9 NH4OH | 702.5 | 16.5 | 2666.2 | 0.109 |
| pH 10 NH4OH | 681.0 | 13.0 | 2487.5 | 0.068 |
| pH 11 NH4OH | 794.0 | 38.0 | 2336.6 | 0.020 |
| pH 7 CH3NH2 | 665.0 | 24.7 | 3052.1 | 0.076 |
| pH 8 CH3NH2 | 864.7 | 31.2 | 1885.8 | 0.084 |
| pH 9 CH3NH2 | 718.0 | 27.0 | 2909.2 | 0.068 |
| pH 10 CH3NH2 | 636.0 | 24.8 | 736.7 | 0.048 |
| pH 11 CH3NH2 | 746.5 | 29.2 | 2209.1 | 0.054 |

Summary of Results Analysed by Groups

TABLE NO 2

Summary of data. Mean values of treatments performed with each pH ± standard deviation

| | µg prot/ mg lyoph. | µg PhI p 5/ mg lyoph. | HEPL/mg | µg 50% inh. |
|---|---|---|---|---|
| Native | 603.0 | 19.6 | 952 | 0.105 |
| 6 (W/O treat.) | 584.0 | 21.6 | 1262 | 0.097 |
| 7 | 718.7 ± 59.4 | 25.7 ± 3.5 | 1805 ± 759 | 0.118 ± 0.060 |
| 8 | 758.2 ± 61.8 | 31.5 ± 5.2 | 1769 ± 645 | 0.131 ± 0.030 |
| 9 | 694.3 ± 82.1 | 24.7 ± 6.2 | 1698 ± 858 | 0.131 ± 0.038 |
| 10 | 706.5 ± 49.6 | 23.2 ± 5.9 | 1491 ± 824 | 0.068 ± 0.025 |
| 11 | 707.7 ± 80.9 | 27.5 ± 7.2 | 1617 ± 784 | 0.047 ± 0.036 |

TABLE NO 3

Summary of data. Mean values of treatments performed with each base ± standard deviation

| | µg prot/ mg lyoph. | µg PhI p 5/ mg lyoph. | HEPL/mg | µg 50% inh. |
|---|---|---|---|---|
| Native | 603.0 | 19.6 | 952 | 0.105 |
| 6 (W/O treat.) | 584.0 | 21.6 | 1262 | 0.097 |
| NaOH | 725.6 ± 81.3 | 24.1 ± 3.8 | 1401 ± 593 | 0.115 ± 0.018 |
| LiOH | 738.6 ± 30.8 | 28.3 ± 6.7 | 1708 ± 553 | 0.091 ± 0.045 |
| KOH | 722.9 ± 86.9 | 29.1 ± 6.7 | 984 ± 503 | 0.100 ± 0.059 |
| Urea | 668.0 ± 52.7 | 26.3 ± 2.8 | 1384 ± 346 | 0.195 ± 0.036 |
| NH4OH | 705.7 ± 55.0 | 24.4 ± 9.9 | 2353 ± 285 | 0.081 ± 0.042 |
| CH3NH2 | 726.0 ± 88.8 | 27.4 ± 2.8 | 2159 ± 930 | 0.066 ± 0.015 |

Native and samples without treatment do not present standard deviation since only one sample was analysed.

SDS and Western Blot

SDS and western-blot were performed with all depigmented samples compared with native extract (*Phleum*).

Figure 9:
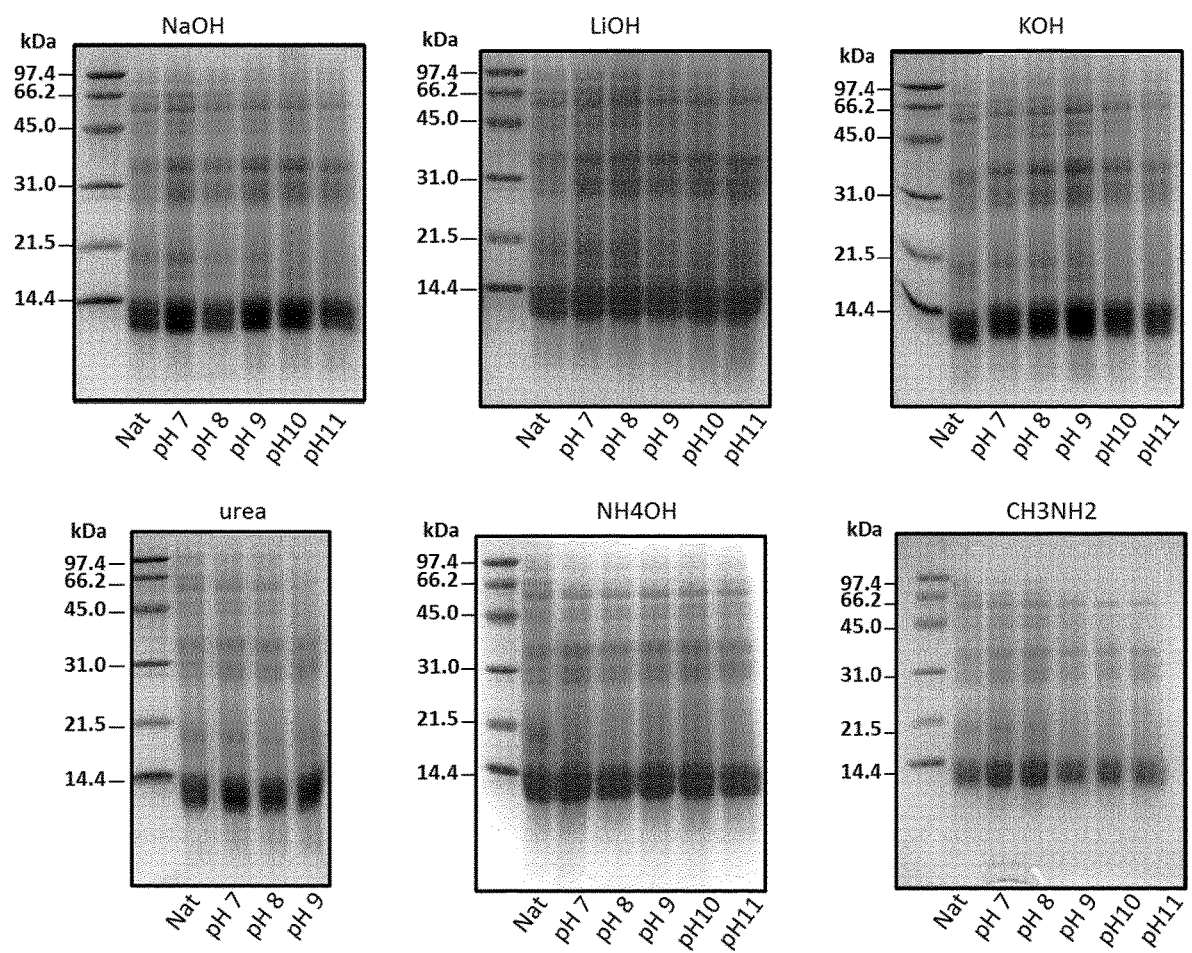
FIG. 9 shows SDS of *P. pratense* extracts treated with different bases.

All electrophoresis were performed under reducing conditions, in acrylamide gels at 15% T. All lanes were loaded with the same µg of lyophilized samples (25 µg). Gels were stained with Coomassie R-250. Membranes were incubated with a pool of sera of patients presenting IgE to *P. pratense* (determined using ELISA) diluted 1/5. Afterwards, membranes were incubated with α-IgE-PO and developed using chemiluminescence. SDS results are showed in FIG. 9. Western blots are shown in FIG. 10.

The most intense bands for the native extract were observed at 11, 37 and 31 kDa (in intensity order). The most important difference observed in SDS of depigmented samples was the decrease in intensity of high molecular bands as the pH increased, although this effect only led to less intense bands, and no bands were completely removed.

Note: Some bands have been sequenced in *P. pratense* IHRP. Phl p 5 was identified in the 37 kDa band, Phl p 1 in the 31 kDa band, and Phl p 2 (or 3) and 6 was identified in 12 kDa band. These allergens have been reported in the IUIS at slightly different molecular weights: Phl p 5 at 32 kDa, Phl p 1 at 27 kDa, Phl p 2 at 10-12 kDa and Phl p 6 at 11 kDa. Other allergens described in the IUIS are Phl p 4 and 13, at 55 kDa, Phl p 7 (calcium binding protein), at 6 kDa, Phl p 11 (Ole e 1-related), at 20 kDa and Phl p 12 (profiling), at 14 kDa.

Figure 10:
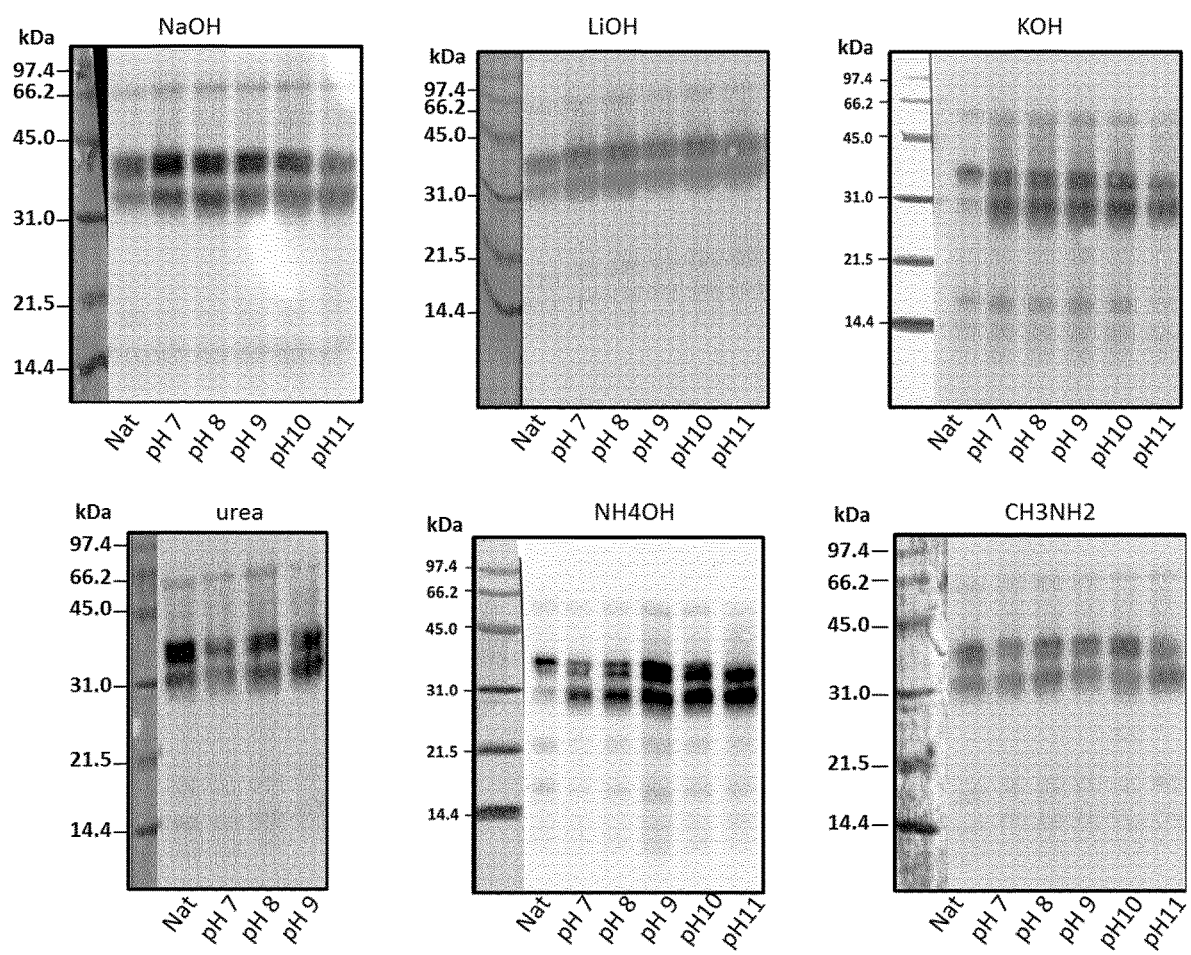
FIG. 10 shows western-blot of *P. pratense* extracts treated with different bases.

In addition, western-blots were performed (FIG. 10). The most intense bands in native extract corresponded to 37, 31, 59, 15 and 12 kDa (in intensity order), which may correspond to Phl p 5, Phl p 1, Phl p 4, Phl p 12 and Phl p 2 and 6 (the last two were in the same band), respectively. No important differences in band intensity were observed with pH change.

SUMMARY

In most basic treatments (26 out of 28) protein content was higher than native and untreated samples, confirming that the basic treatment is responsible for the results.

Regarding major allergen content, Phl p 5 levels were higher in pH 8 treatments.

In relation to ELISA competition (REINA), there was not a clear tendency depending on the pH or base treatment used, although treatments with ammonium hydroxide presented higher potency.

In relation to ELISA inhibition (IgE), the highest values (µg of 50% inhibition) corresponded to pH 10 and 11.

Protein profiles and allergenic profiles were not significantly affected with different pH treatments nor with different bases.

General Conclusions

In general, treatment with bases yielded better results in terms of protein concentration and major allergen content. Protein and major allergen profiles in SDS PAGE were not affected by the basic treatment.

Example 2: *Olea europea*

Depigmented *Olea europaea* extract was obtained in accordance with method steps A to C.

Protein Content

Figure 11:
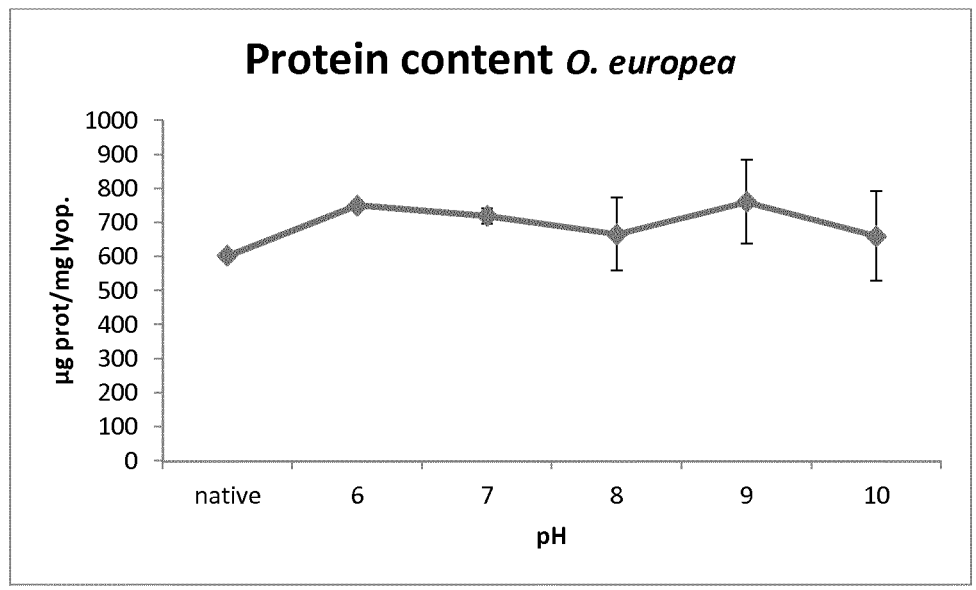
FIG. 11 shows protein content of *O. europaea* extracts determined using Lowry-Biuret method of lyophilized samples obtained after treatment with different pH. Error bars refer to standard deviation of different samples mean value.
Figure 12:
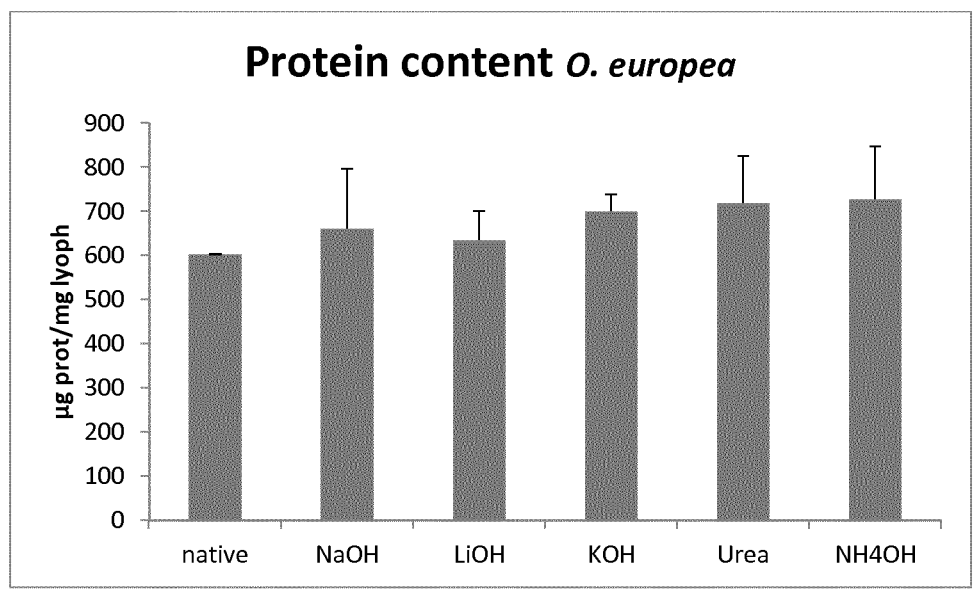
FIG. 12 shows protein content of *O. europaea* extracts determined using Lowry-Biuret method of lyophilized samples obtained after treatment with different bases. Error bars refer to the standard deviation of different samples mean value.

Maximum protein content was obtained after treatment using methylamine pH 9 (862 µg protein/mg lyophilized extract), and minimum content corresponds to sodium hydroxide pH 10 treatment (441 µg protein/mg lyophilized extract). Mean value was 696 µg protein/mg lyophilized extract (Table 4, FIGS. 11 and 12).

ELISA Competition (IgE)—Biological Potency

Medium value was 302 HEPL/mg lyophilized extract. The highest value corresponded to sample treated with sodium hydroxide pH 8 (582 HEPL/mg) and the lowest was treated with methylamine pH 7 (128 HEPL/mg) (Table 4).

Figure 13:
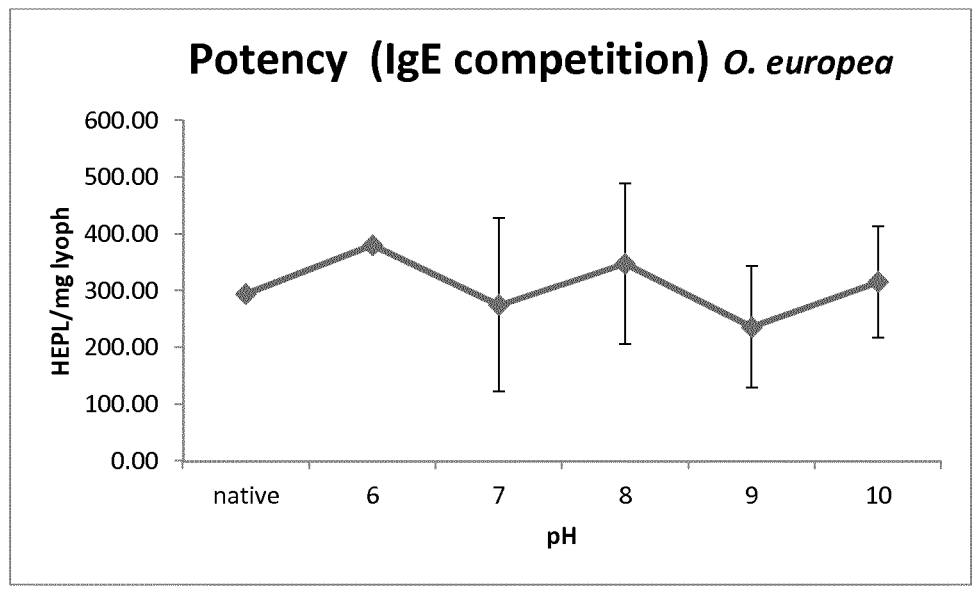
FIG. 13 shows biological potency of *O. europaea* extracts determined using ELISA competition method of lyophilized samples obtained after treatment with different pH. Error bars refer to the standard deviation of different samples mean value.
Figure 14:
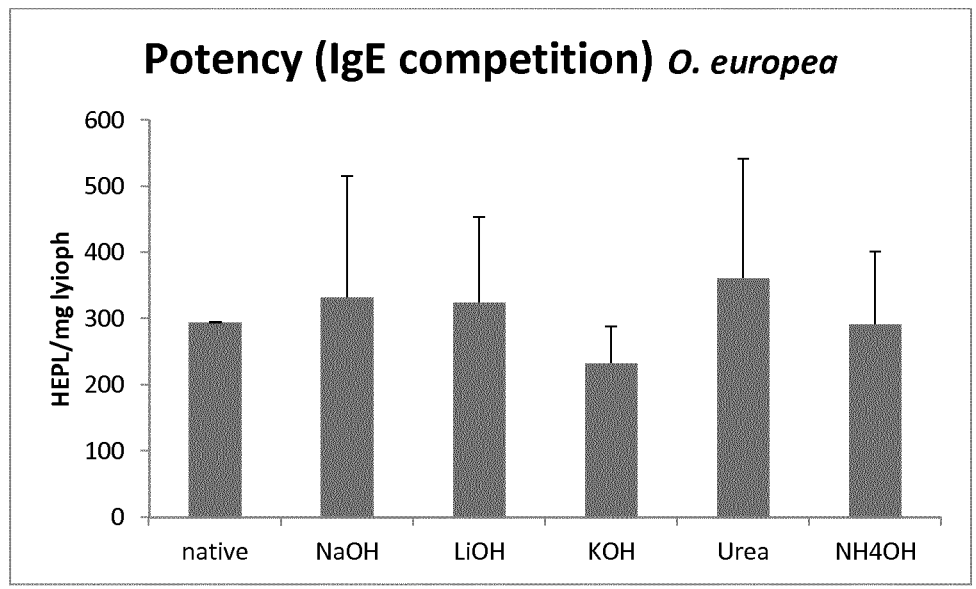
FIG. 14 shows biological potency of *O. europaea* extracts determined using ELISA competition method of lyophilized samples obtained after treatment with different bases. Error bars refer to the standard deviation of different samples mean value.

The highest biological potency was observed in treatments at pH 8 (347 HEPL/mg), and the lowest at pH 9 (236 HEPL/mg) (Table 5, FIG. 13).

ELISA Inhibition (IgE)

The amount of lyophilized extract necessary to reach 50% inhibition is inversely proportional to the potency of that extract. Micrograms of lyophilized necessary to reach 50% inhibition did not present significant correlation with HEPL/mg values (Spearman Rank Order Correlation). The lowest value corresponded to urea at pH 9 (0.043 µg), and the maximum was lithium hydroxide pH 10 (0.132 µg) (Table 4). Mean value of depigmented samples was 0.088 µg.

Figure 15:
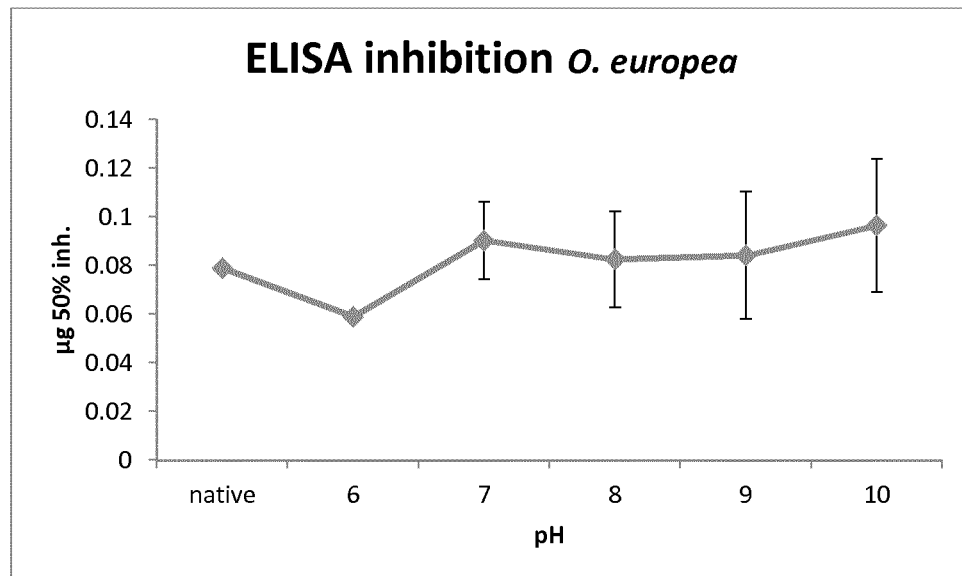
FIG. 15 shows µg necessary to obtain 50% inhibition of IgE binding to native extract of *O. europaea* of lyophilized samples obtained after treatment with different pH. Error bars refer to the standard deviation of different samples mean value.
Figure 16:
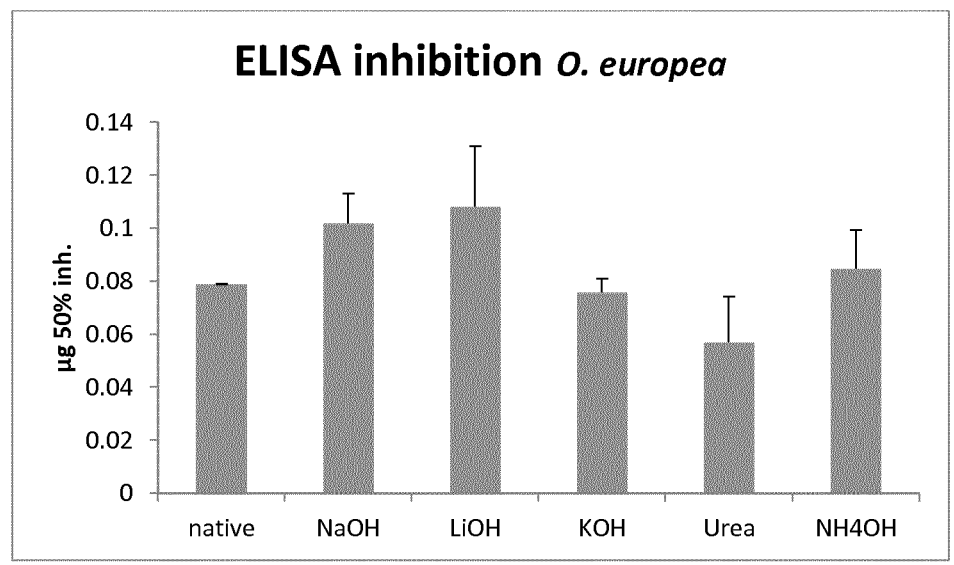
FIG. 16 shows µg necessary to obtain 50% inhibition of IgE binding to native extract of *O. europaea* of lyophilized samples obtained after treatment with different bases. Error bars refer to the standard deviation of different samples mean value.
Figure 17:
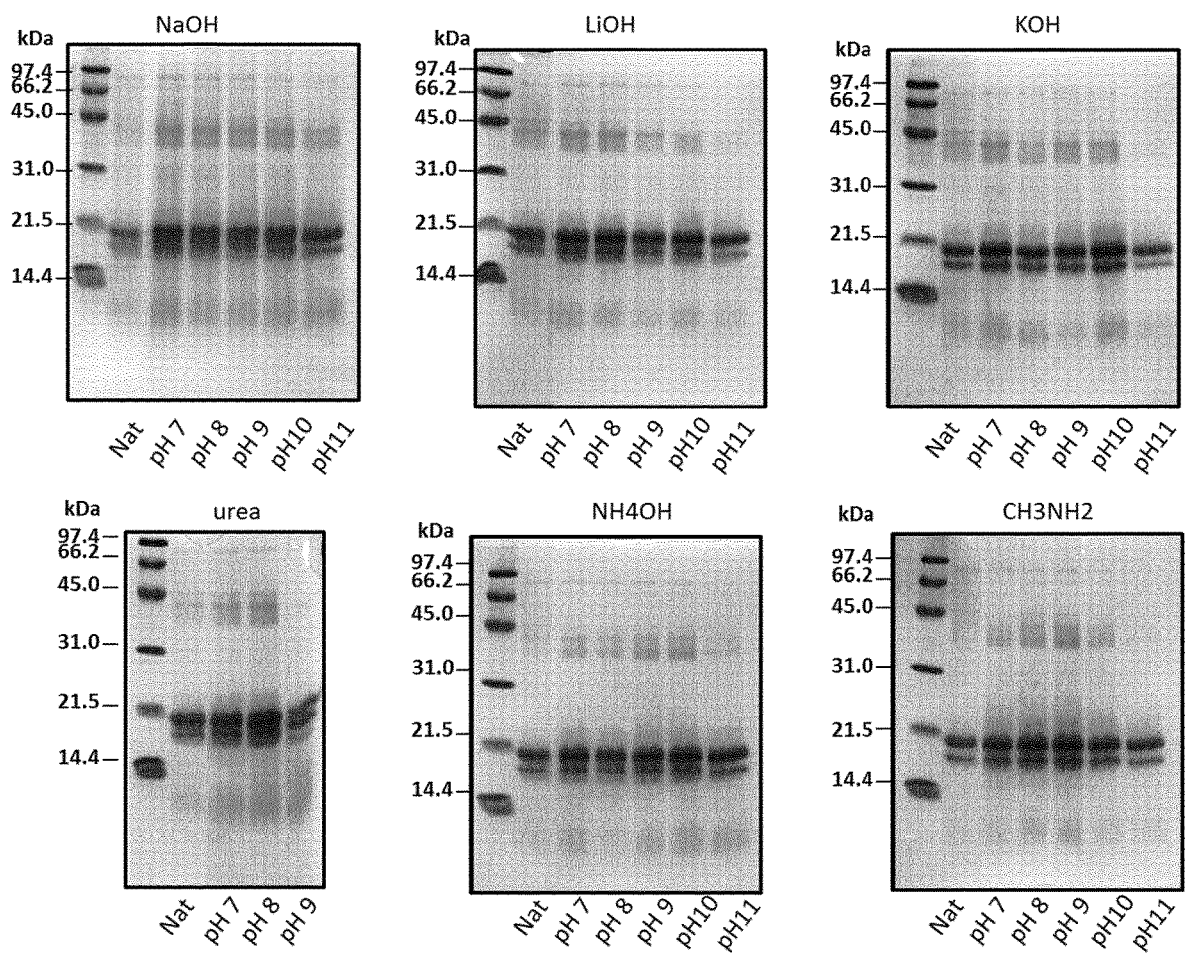
FIG. 17 shows SDS of *O. europaea* extracts treated with different bases.

Values obtained at different pH were very similar (Table 5, FIG. 15). Greater differences were obtained using different bases. The highest value was obtained with lithium hydroxide (mean value 0.108 µg), and the lowest with urea (0.057 µg) (Table 4, FIG. 16).

Table of Individual Results

TABLE NO 4

Individual data

| Samples | µg prot/ mg lyoph. | HEPL/mg | µg 50% inh. |
|---|---|---|---|
| Native | 603.0 | 294.6 | 0.079 |
| W/O treat. pH 6 | 750.0 | 380.1 | 0.059 |
| pH 7 NaOH | 735.5 | 467.8 | 0.083 |
| pH 8 NaOH | 644.5 | 582.0 | 0.105 |
| pH 9 NaOH | 790.5 | 157.0 | 0.105 |
| pH 10 NaOH | 440.5 | 219.3 | 0.112 |
| pH 11 NaOH | 694.0 | 233.7 | 0.106 |
| pH 7 LiOH | 687.5 | 208.8 | 0.120 |
| pH 8 LiOH | 631.5 | 270.3 | 0.073 |
| pH 9 LiOH | 522.5 | 245.0 | 0.117 |
| pH 10 LiOH | 670.5 | 368.5 | 0.132 |
| pH 11 LiOH | 660.0 | 529.1 | 0.101 |
| pH 7 KOH | 722.5 | 206.1 | 0.084 |
| pH 8 KOH | 701.5 | 248.6 | 0.074 |
| pH 9 KOH | 747.5 | 182.1 | 0.072 |
| pH 10 KOH | 681.5 | 206.7 | 0.072 |
| pH 11 KOH | 648.5 | 322.0 | 0.079 |
| pH 7 Urea | 712.0 | 469.1 | 0.076 |
| pH 8 urea | 617.0 | 461.0 | 0.052 |
| pH 9 urea | 828.0 | 153.8 | 0.043 |
| pH 7 NH4OH | 706.0 | 168.2 | 0.083 |
| pH 8 NH4OH | 856.5 | 288.7 | 0.097 |
| pH 9 NH4OH | 814.5 | 439.7 | 0.077 |
| pH 10 NH4OH | 713.5 | 351.8 | 0.101 |
| pH 11 NH4OH | 552.0 | 211.3 | 0.066 |
| pH 7 CH3NH2 | 750.0 | 127.9 | 0.096 |
| pH 8 CH3NH2 | 540.0 | 233.3 | 0.095 |
| pH 9 CH3NH2 | 862.0 | 238.1 | 0.091 |
| pH 10 CH3NH2 | 795.0 | 430.1 | 0.066 |
| pH 11 CH3NH2 | 774.5 | 429.1 | 0.092 |

Summary of Results Analysed by Groups

TABLE NO 5

Summary of data. Mean values of treatments performed with each pH ± standard deviation

| | µg prot/ mg lyoph. | HEPL/mg | µg 50% inh. |
|---|---|---|---|
| Native | 603.0 | 294.6 | 0.079 |
| 6 (W/O treat.) | 750.0 | 380.1 | 0.059 |
| 7 | 718.9 ± 22.2 | 274.7 ± 153.0 | 0.090 ± 0.016 |
| 8 | 665.2 ± 107.2 | 347.3 ± 141.5 | 0.083 ± 0.020 |
| 9 | 760.8 ± 122.9 | 235.9 ± 107.2 | 0.084 ± 0.026 |

TABLE NO 5-continued

Summary of data. Mean values of treatments performed with each pH ± standard deviation

| | µg prot/ mg lyoph. | HEPL/mg | µg 50% inh. |
|---|---|---|---|
| 10 | 660.2 ± 132.1 | 315.3 ± 97.9 | 0.096 ± 0.027 |
| 11 | 665.8 ± 80.5 | 345.0 ± 133.9 | 0.089 ± 0.016 |

TABLE NO 6

Summary of data. Mean values of treatments performed with each base ± standard deviation.

| | µg prot/ mg lyoph. | HEPL/mg | µg 50% inh. |
|---|---|---|---|
| Native | 603.0 | 294.6 | 0.079 |
| 6 (W/O treat.) | 750.0 | 380.1 | 0.059 |
| NaOH | 661.0 ± 134.4 | 331.9 ± 183.0 | 0.102 ± 0.011 |
| LiOH | 634.4 ± 65.8 | 324.3 ± 128.9 | 0.108 ± 0.023 |
| KOH | 700.3 ± 37.9 | 233.1 ± 55.1 | 0.076 ± 0.005 |
| Urea | 719.0 ± 105.7 | 361.3 ± 179.7 | 0.057 ± 0.017 |
| NH4OH | 728.5 ± 118.0 | 291.9 ± 108.7 | 0.085 ± 0.014 |
| CH3NH2 | 744.3 ± 121.6 | 291.7 ± 133.4 | 0.088 ± 0.012 |

Native and samples without treatment do not present standard deviation since only one sample was obtained.

Immunoblot and SDS-PAGE

SDS and western-blot were performed with all depigmented samples compared with native extract.

All electrophoresis were performed under reducing conditions, in acrylamide gels at 15% T. All lanes were loaded with the same quantity of lyophilized extract (25 µg). Gels were stained with Coomassie R-250. In addition, western-blot membranes were incubated with a pool of sera of patients presenting IgE to O. europaea (determined using ELISA) diluted 1/5. Afterwards, membranes were incubated with α-IgE-PO and developed using chemiluminescence.

Figure 22:
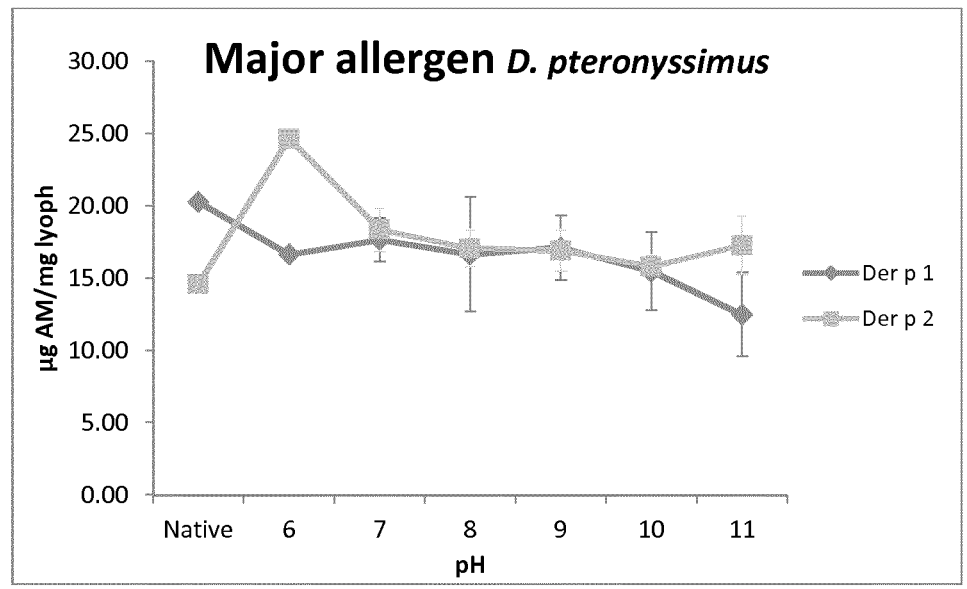
FIG. 22 shows major allergen content of *D. pteronyssinus* extracts determined using specific ELISA sandwich kit (Indoor) for Der p 1 and Der p 2 of lyophilized samples obtained after treatment with different pH. Error bars refer to the standard deviation of different samples mean value.

Most intense bands in SDS of native extract were observed at 20 and 18 kDa (in intensity order, FIG. 22). Both bands have been identified in the IHRP as Ole e 1, major allergen of Olea. There were also bands at 10.5, 42, 48, 73 and 89 kDa. Other allergens reported in the IUIS are Ole e 2 (profilin, 15 kDa), Ole e 3 (polcalcin, 9 kDa), Ole e 4 (32 kDa), Ole e 5 (16 kDa), Ole e 6 (10 kDa), Ole e 7 (nsLTP, 9-10 kDa), Ole e 8 (21 kDa), Ole e 9 (46 kDa), Ole e 10 (11 kDa) and Ole e 11 (39.4 kDa).

The most important difference observed in SDS of depigmented samples was the decrease in high molecular bands as the pH is more basic, especially at pH 11. However, in the case of treatments with urea, it was observed at pH 9.

Figure 18:
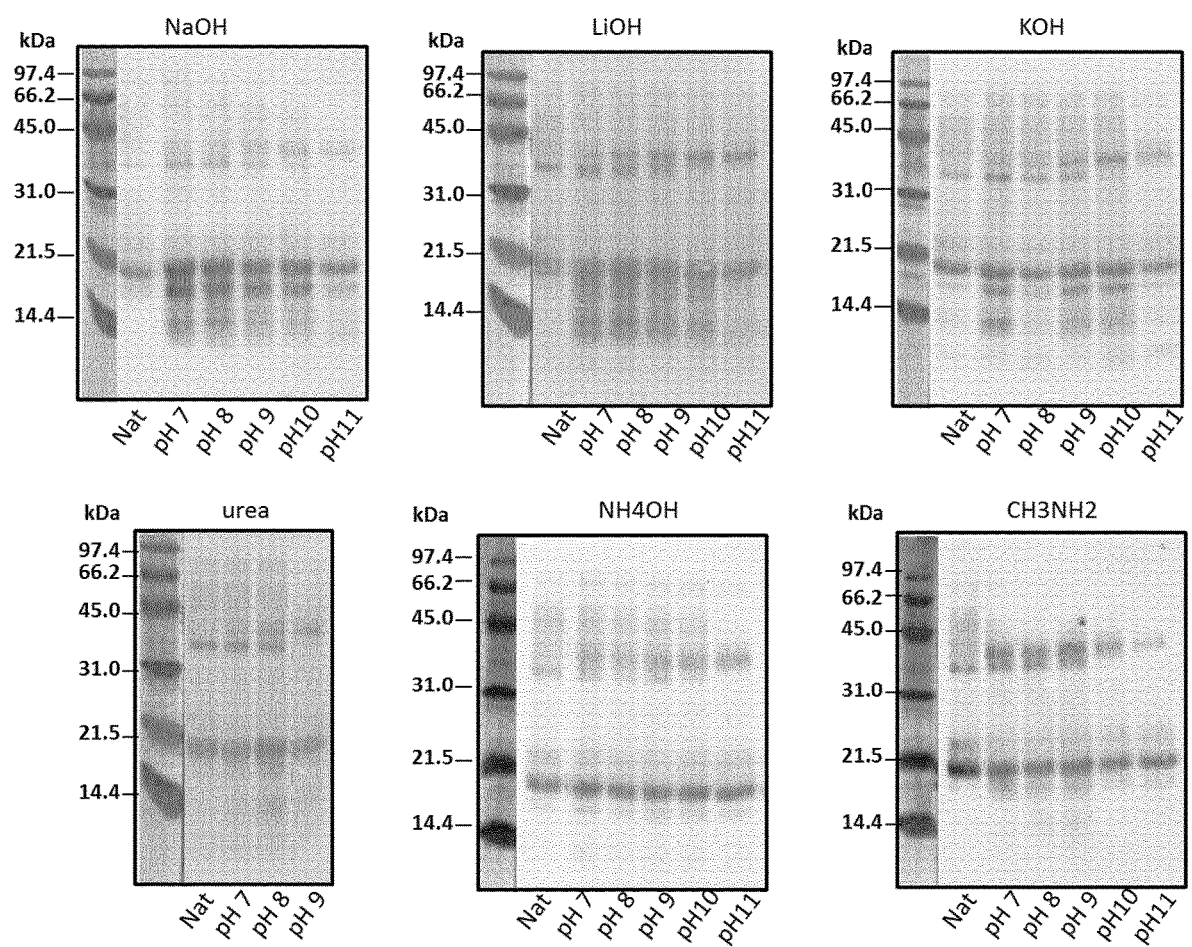
FIG. 18 shows western-blot of *O. europaea* extracts treated with different bases.

In addition, western-blots were performed (FIG. 18). The most intense bands in native extract corresponded to 19 and 17 kDa (Ole e 1). Other observed bands were at 13, 34, 38, 48 and 74 kDa. There were not clear differences in treatments with bases. However, bands at 34 and 13 kDa were lost at high pH (pH 9 with urea, pH 10 and 11 with other bases).

Thin Layer Chromatography

Thin layer chromatography was performed with all the samples and results were compared to the native. Reference standards (vegetal origin) were also used as technique control.

Figure 19:
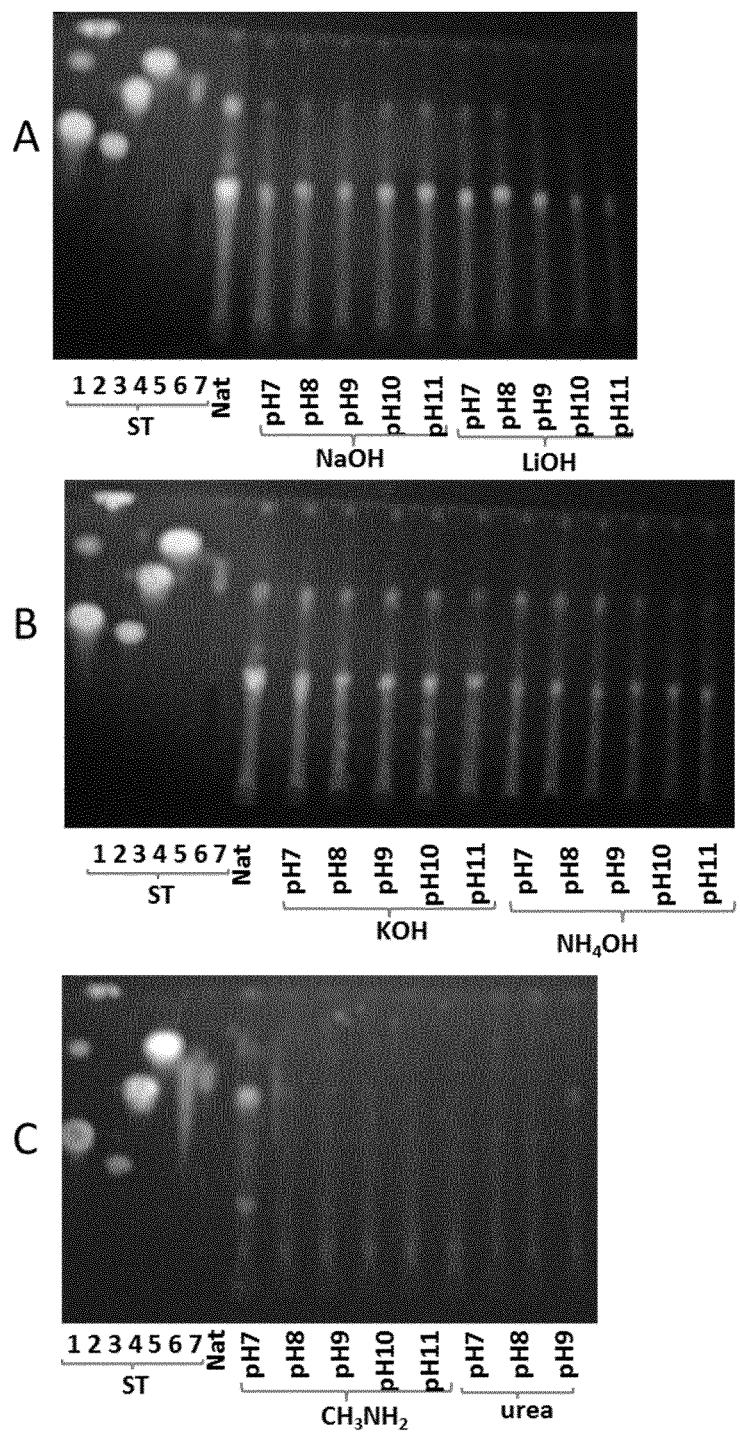
FIG. 19 shows thin layer chromatography for *O. europaea*. A, samples treated with sodium and lithium hydroxide; B, treatments with ammonium hydroxide, sodium hydroxide and urea; C, treatments with methylamine. All assays were compared with native extract. Standards are: 1, chlorogenic acid; 2, quercetin; 3, rutin trihydrate; 4, isoquercitrin; 5, quercitrin; 6, kaempferol 3-glucoside; 7, apigenin 7-glucoside.
Figure 20:
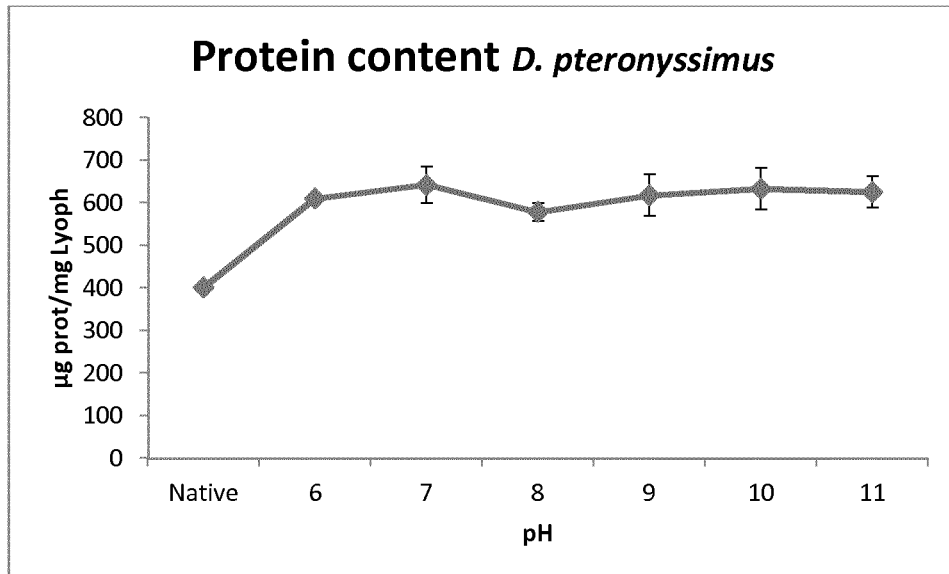
FIG. 20 shows protein content of *D. pteronyssinus* extracts determined using Lowry-Biuret method of lyophilized samples obtained after treatment with different pH. Error bars refer to the standard deviation of different samples mean value.

Results are shown in FIG. 19. Up to five different flavonoids could be observed in Olea samples. Intensity of signals was higher in native extract than in depigmented samples.

SUMMARY

Protein content and ELISA competition (REINA): no significant differences were observed between groups.

In relation to ELISA inhibition (IgE), no differences were observed between pHs, but between bases. The lowest potency (more µg needed to reach 50% inhibition) corresponded to sodium hydroxide and lithium hydroxide treated samples.

Protein profiles and allergenic profiles presented, in general, weaker high molecular bands as the pH increased (pH 9-10), especially when treated with urea.

Thin layer chromatography showed a decrease in the amount of pigments during basic treatment.

General Conclusions

1. In general, treatment of *O. europeae* extracts with bases yielded better results in terms of protein content, compared to native.
2. There was a loss of high molecular weight proteins (and allergens) at high pH treatment, which implies an enrichment in major allergens (which have lower molecular weight).

Example 3: *D. pteronyssinus*

Depigmented *D. pteronyssinus* extract was obtained in accordance with method steps A to C.

Protein Content

Maximum protein content was obtained after treatment with ammonium hydroxide pH 7 (710 µg protein/mg lyophilized extract), and minimum content corresponds to $CH_3NH_2$ pH 8 treatment (561.5 µg protein/mg lyophilized extract) (Table 7). Mean value of depigmented samples is 5985 µg protein/mg lyophilized extract (Table 7).

Protein content was higher in all treatments than in native extract.

Figure 21:
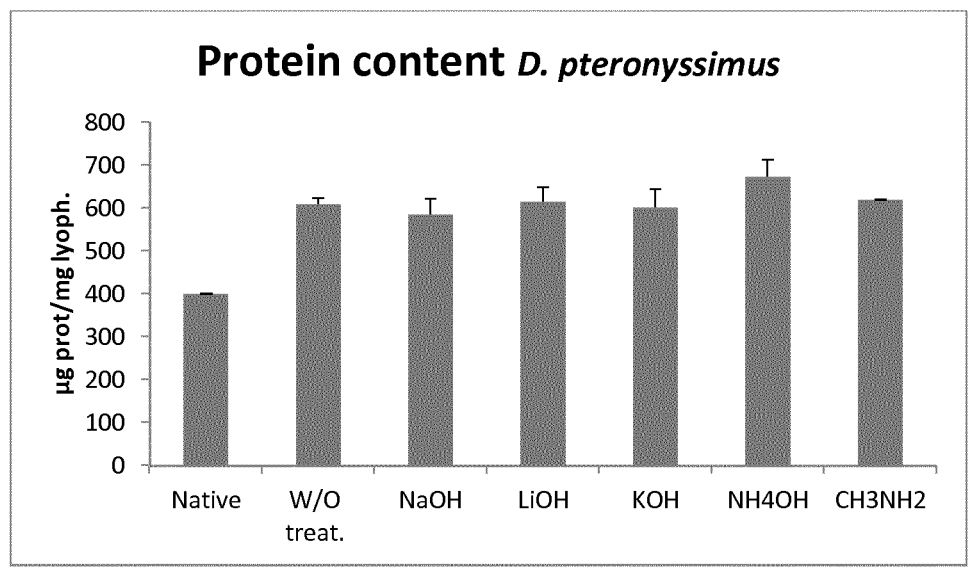
FIG. 21 shows protein content of *D. pteronyssinus* extracts determined using Lowry-Biuret method of lyophilized samples obtained after treatment with different bases. Error bars refer to the standard deviation of different samples mean value.

In relation to the use of a particular base, the highest protein content values were obtained with ammonium hydroxide, whilst NaOH treatments presented the lowest concentrations (Table 9, FIG. 21).

Major Allergen Content

The highest level of Der p 1 corresponded to native extract (20.3 µg Der p 1/mg lyophilized extract), followed by pH 7, and 9 (mean of 17.6 and 17.1 µg Der p 1/mg lyophilized extract, respectively). Mean depigmented value was 16.1 µg Der p 1/mg lyophilized extract (FIG. 22, Tables 7 and 8).

Figure 23:
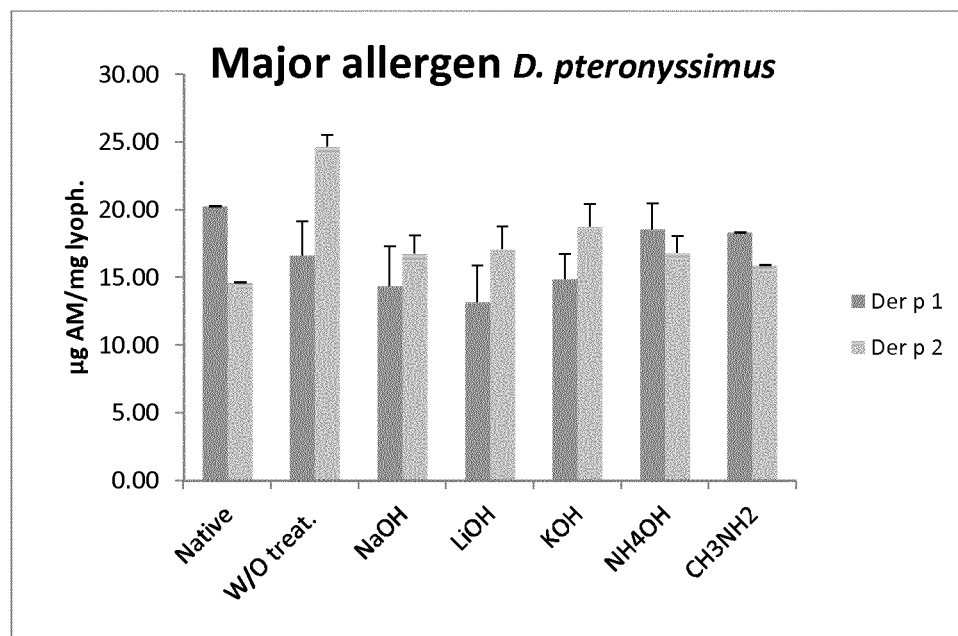
FIG. 23 shows major allergen content of *D. pteronyssinus* extracts determined using specific ELISA sandwich kit (Indoor) for Der p 1 and Der p 2 of lyophilized samples obtained after treatment with different acid or base. Error bars refer to the standard deviation of different samples mean value.
Figure 24:
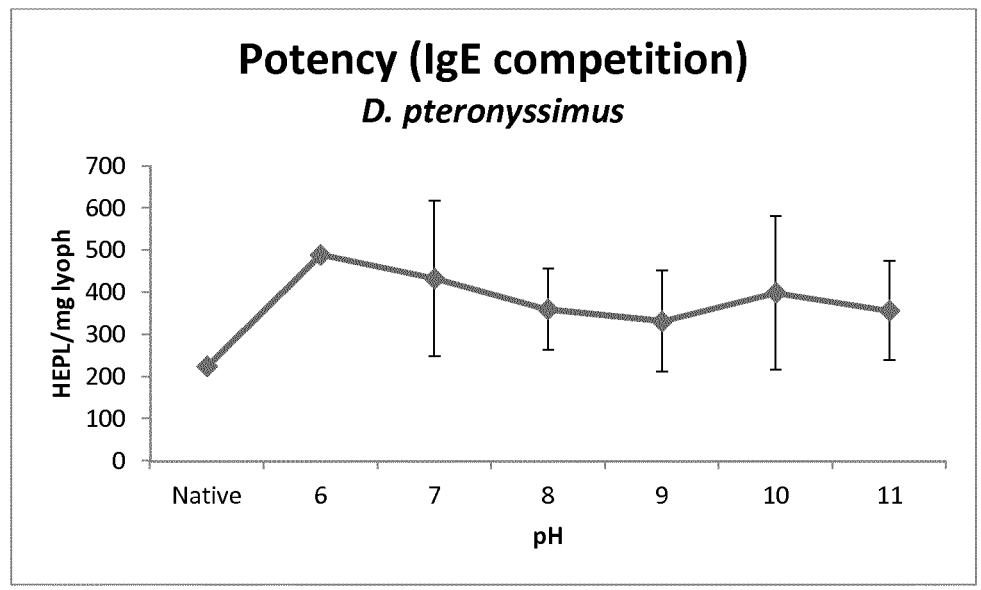
FIG. 24 shows biological potency of *D. pteronyssinus* extracts determined using ELISA competition method of lyophilized samples obtained after treatment with different pH. Error bars refer to the standard deviation of different samples mean value.
Figure 25:
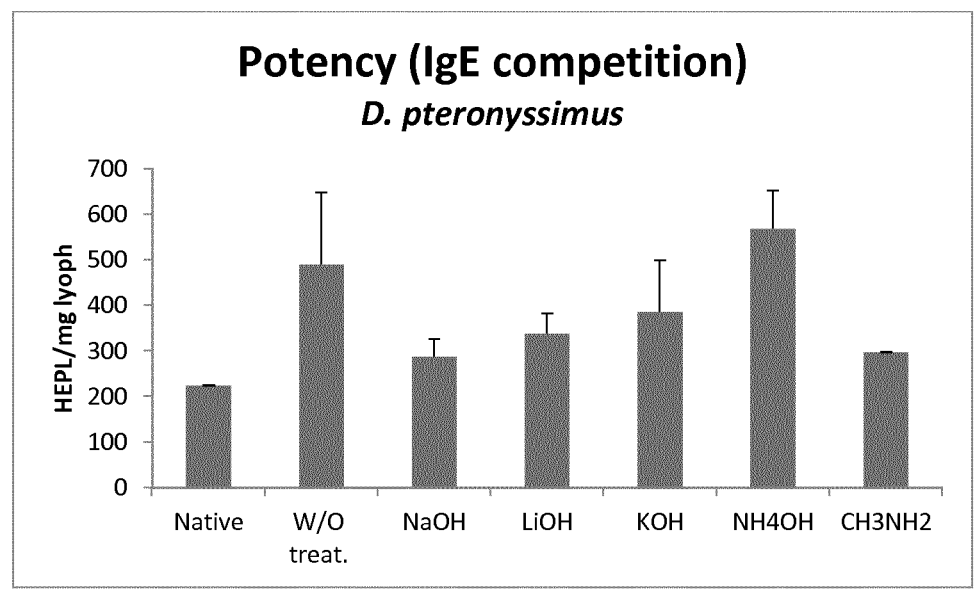
FIG. 25 shows biological potency of *D. pteronyssinus* extracts determined using ELISA competition method of lyophilized samples obtained after treatment with different pH. Error bars refer to the standard deviation of different samples mean value.

Regarding the treatment with different bases, Der p 1 levels of samples treated with ammonium hydroxide and methylamine (means of 18.6 and 18.4 µg Der p 1/mg lyophilized extract, respectively) are the highest (FIG. 23, Table 9).

ELISA Competition (IgE)

Figure 29:
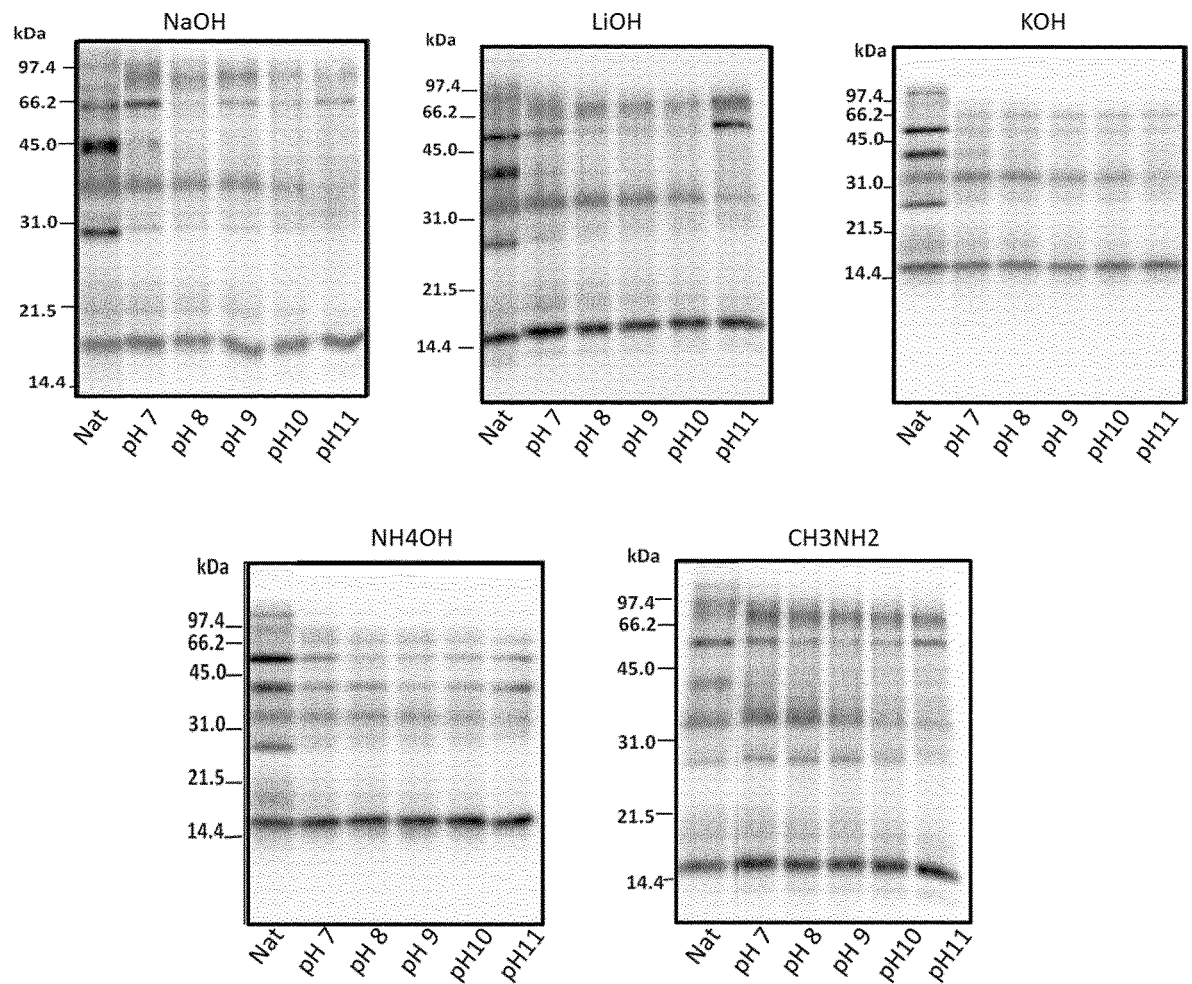
FIG. 29 shows western-blot of *D. pteronyssinus* extracts treated with different bases.

The highest biological potency corresponded to samples treated at pH 7 with ammonium hydroxide (707 HEPL/mg lyophilized extract). The lowest value corresponds to treatments with NaOH (185.5 and 168.3 HEPL/mg lyophilized extract at pH 10 and 11, respectively) (Table 7). Medium value of depigmented samples was 356 HEPL/mg lyophilized extract (FIGS. 29 and 30).

ELISA Inhibition (IgE)

Micrograms of lyophilized necessary to reach 50% inhibition were inversely proportional to HEPL/mg values.

The lowest 50% inhibition value corresponded to methylammonium pH 9, followed by native extract (0.024 and 0.030 µg, respectively, Table 7).

Figure 26:
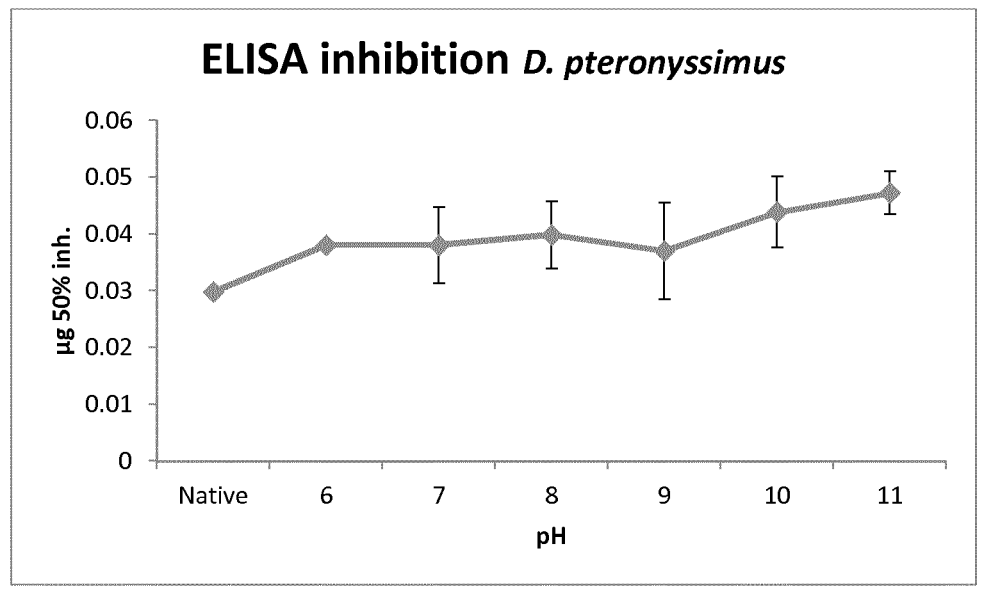
FIG. 26 shows biological potency of *D. pteronyssinus* extracts determined using ELISA inhibition method of lyophilized samples obtained after treatment with different pH (µg necessary to obtain 50% inhibition of IgE binding to native extract). Error bars refer to the standard deviation of different samples mean value.
Figure 27:
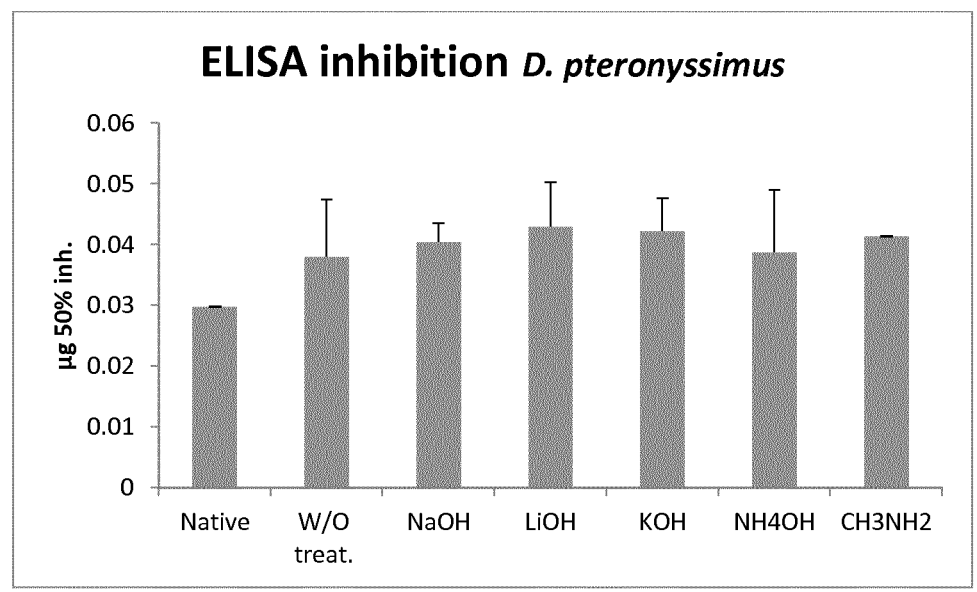
FIG. 27 shows biological potency of *D. pteronyssinus* extracts determined using ELISA inhibition method of lyophilized samples obtained after treatment with different bases (µg necessary to obtain 50% inhibition of IgE binding to native extract). Error bars refer to the standard deviation of different samples mean value.
Figure 28:
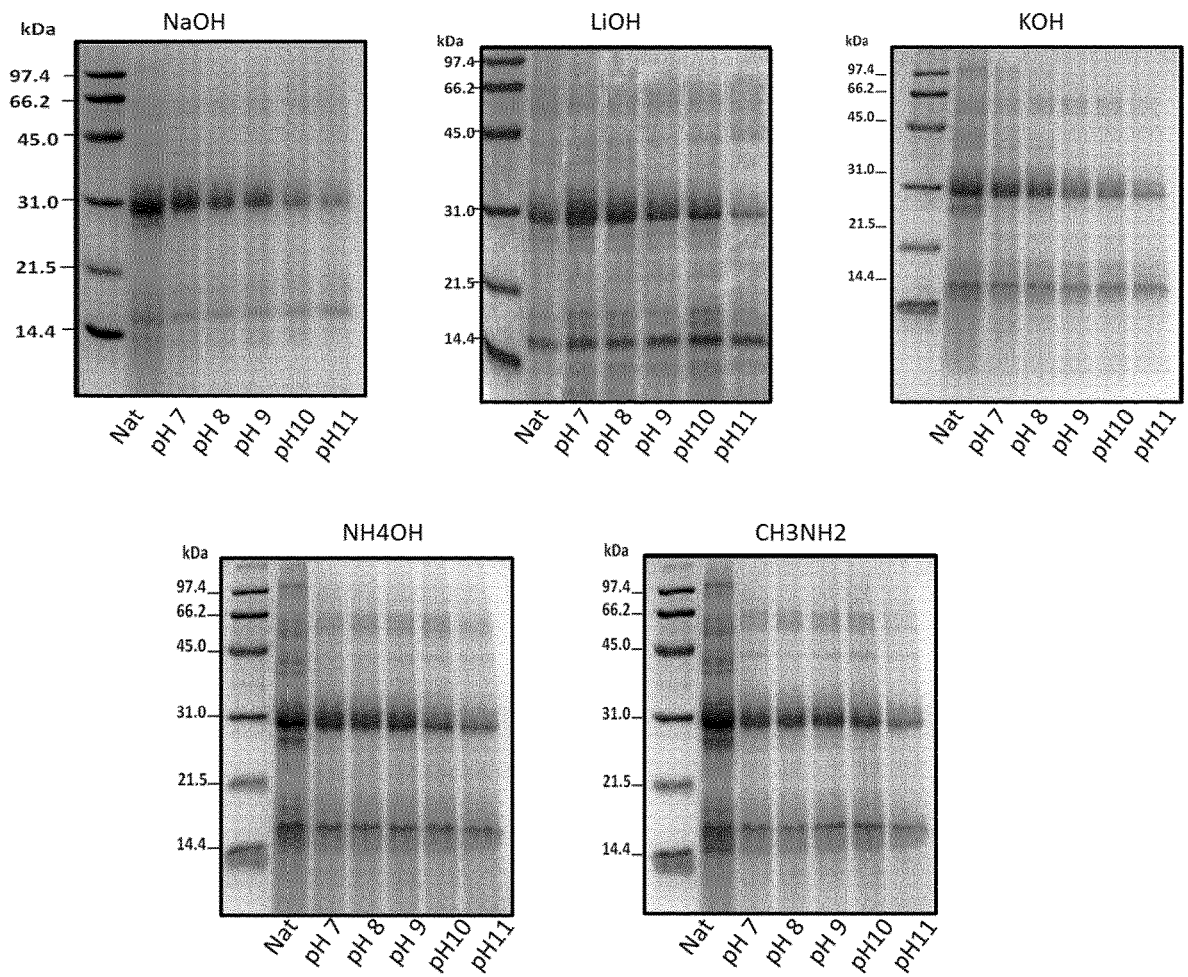
FIG. 28 shows SDS of *D. pteronyssinus* extracts treated with different bases.

No clear differences were observed between pH groups (FIG. 26, Table 8). Regarding the base used, the highest 50% inhibition values corresponded to treatments with LiOH (mean of 0.043 µg). Lowest values were observed in native extract, treated with ammonium hydroxide and sample at pH 6 (without treatment) (0.030, 0.39 and mean of 0.04, respectively) (FIG. 27, Table 9).

Table of Individual Results

TABLE NO 7

| | Individual data. | | | | |
|---|---|---|---|---|---|
| Samples | µg prot/ mg lyoph. | µg Der p 1/ mg lyoph. | µg Der p 2/ mg lyoph. | HEPL/mg | µg 50% inh. |
| Native | 400.5 | 20.3 | 14.6 | 223.9 | 0.030 |
| W/O treat. pH 6 | 610.0 | 16.6 | 24.7 | 489.4 | 0.038 |
| pH 7 NaOH | 602.0 | 17.6 | 17.3 | 502.0 | 0.033 |
| pH 8 NaOH | 581.0 | 12.5 | 16.2 | 412.4 | 0.033 |
| pH 9 NaOH | 567.0 | 16.1 | 16.4 | 185.5 | 0.035 |
| pH 10 NaOH | 587.5 | 14.0 | 15.9 | 168.3 | 0.048 |
| pH 11 NaOH | 590.0 | 11.5 | 18.0 | 171.9 | 0.053 |
| pH 7 LiOH | 610.5 | 16.2 | 19.0 | 332.0 | 0.040 |
| pH 8 LiOH | 562.3 | 12.2 | 15.8 | 288.9 | 0.041 |
| pH 9 LiOH | 608.3 | 15.7 | 16.6 | 321.5 | 0.043 |
| pH 10 LiOH | 630.5 | 12.7 | 16.4 | 376.0 | 0.048 |
| pH 11 LiOH | 661.5 | 8.9 | 17.9 | 375.3 | 0.043 |
| pH 7 KOH | 655.0 | 16.1 | 19.6 | 404.2 | 0.031 |
| pH 8 KOH | 574.5 | 18.5 | 18.9 | 394.5 | 0.039 |
| pH 9 KOH | 611.5 | 14.7 | 19.4 | 360.6 | 0.046 |
| pH 10 KOH | 585.5 | 14.2 | 15.9 | 441.8 | 0.048 |
| pH 11 KOH | 581.0 | 11.0 | 20.0 | 331.0 | 0.047 |
| pH 7 NH4OH | 710.0 | 19.3 | 19.7 | 707.3 | 0.038 |
| pH 8 NH4OH | 612.5 | 19.5 | 16.6 | 468.9 | 0.037 |
| pH 9 NH4OH | 699.0 | 19.5 | 16.4 | 511.4 | 0.037 |
| pH 10 NH4OH | 701.0 | 19.2 | 16.4 | 671.1 | 0.034 |
| pH 11 NH4OH | 645.0 | 15.3 | 15.2 | 481.5 | 0.048 |
| pH 7 CH3NH2 | 632.0 | 19.0 | 16.3 | 218.2 | 0.048 |
| pH 8 CH3NH2 | 561.5 | 20.5 | 17.8 | 232.8 | 0.049 |

TABLE NO 7-continued

Individual data.

| Samples | µg prot/<br>mg lyoph. | µg Der p 1/<br>mg lyoph. | µg Der p 2/<br>mg lyoph. | HEPL/mg | µg<br>50% inh. |
|---|---|---|---|---|---|
| pH 9 CH3NH2 | 600.5 | 19.5 | 15.8 | 279.0 | 0.024 |
| pH 10 CH3NH2 | 658.5 | 17.2 | 14.5 | 335.2 | 0.041 |
| pH 11 CH3NH2 | 648.5 | 15.6 | 15.3 | 423.5 | 0.045 |

Summary of Results Analysed by Groups

TABLE NO 8

Summary of data. Mean values of treatments performed with each pH ± standard deviation.

| | µg prot/<br>mg lyoph. | µg Der p 1/<br>mg lyoph. | µg Der p 2/<br>mg lyoph. | HEPL/mg | µg<br>50% inh. |
|---|---|---|---|---|---|
| Native | 400.5 | 20.26 | 14.63 | 223.9 | 0.030 |
| 6 (W/O treat.) | 610.0 | 16.63 | 24.66 | 489.4 | 0.038 |
| 7 | 641.9 ± 44.6 | 17.6 ± 3.1 | 18.4 ± 1.5 | 432.8 ± 144.2 | 0.038 ± 0.006 |
| 8 | 578.4 ± 46.2 | 16.6 ± 3.3 | 17.1 ± 1.5 | 359.5 ± 145.4 | 0.040 ± 0.006 |
| 9 | 617.3 ± 45.7 | 17.1 ± 3.3 | 16.9 ± 1.5 | 331.6 ± 146.6 | 0.037 ± 0.007 |
| 10 | 632.6 ± 44.9 | 15.5 ± 3.3 | 15.8 ± 1.7 | 398.5 ± 140.8 | 0.044 ± 0.007 |
| 11 | 625.2 ± 44.4 | 12.5 ± 3.3 | 17.3 ± 1.7 | 356.6 ± 132.9 | 0.047 ± 0.007 |

TABLE NO 9

Summary of data. Mean values of treatments performed with each base ± standard deviation.

| | µg prot/<br>mg lyoph. | µg Der p 1/<br>mg lyoph. | µg Der p 2/<br>mg lyoph. | HEPL/mg | µg<br>50% inh. |
|---|---|---|---|---|---|
| Native | 400.5 | 20.26 | 14.63 | 223.9 | 0.030 |
| 6 (W/O treat.) | 610.0 | 16.63 | 24.66 | 489.4 | 0.038 |
| NaOH | 585.5 ± 12.8 | 14.35 ± 2.52 | 16.77 ± 0.85 | 288.0 ± 157.8 | 0.040 ± 0.009 |
| LiOH | 614.6 ± 36.2 | 13.16 ± 2.95 | 17.12 ± 1.31 | 338.7 ± 37.3 | 0.043 ± 0.003 |
| KOH | 601.5 ± 33.0 | 14.90 ± 2.74 | 18.76 ± 1.65 | 386.4 ± 42.4 | 0.042 ± 0.007 |
| NH4OH | 673.5 ± 42.6 | 18.55 ± 1.83 | 16.84 ± 1.67 | 568.1 ± 112.4 | 0.039 ± 0.005 |
| CH3NH2 | 620.2 ± 39.5 | 18.35 ± 1.92 | 15.93 ± 1.22 | 297.7 ± 83.9 | 0.041 ± 0.010 |

Native and samples without treatment do not present standard deviation since only one sample was obtained.

Immunoblot and SDS-PAGE

SDS and western-blot were performed with all depigmented samples compared with native extract.

All electrophoresis were performed under reducing conditions, in acrylamide gels at 15% T. All lanes were loaded with the same µg of lyophilized (35 µg). Gels were stained with Coomassie R-250. Immunoblots were performed transferring proteins to membranes, which were incubated afterwards with a pool of sera of patients presenting IgE to *D. pteronyssinus* (determined using ELISA) diluted 1/10. Afterwards, membranes were incubated with α-IgE-PO and developed using chemiluminescence.

The most intense bands in native extract SDS were observed at 31, 28 and 15 kDa (FIG. 35). There were no important differences in protein profile in SDS of depigmented samples.

Note: Some bands were sequenced in *D. pteronyssinus* IHRP. Der p 1 and Der p 3 were identified in 31 kDa band, and Der p 10 and Der p 8 were identified in 28 kDa band. Der p 2 was identified at 15 kDa using monoclonal antibody α-Der p 2.

In addition, western-blot was performed (FIG. 29). The most intense bands in native extract corresponded to 15, 28, 37, 46 and 60 kDa. 46 kDa band was weaker in depigmented extracts. In some cases, the band at 60 kDa disappeared (basic treatments), while band at 80 kDa appeared more intense compared to native extract.

Summary

Protein content was not affected by the treatments (no significant differences between groups). Depigmented samples presented higher protein content than native extract. However, this difference was not significant (only one native sample). Even sample at pH 6 (without treatment) presented higher protein content than native extract, similar value to treated samples. So the increase in protein content compared to native extract must be due to the higher purification of these samples (they are dialyzed 5 times more).

Regarding major allergen content, Der p 1 and Der p 2 levels were affected by the use of urea, and not by the pH change.

In relation to ELISA competition (REINA) and inhibition, the worse results (lower HEPL/mg and higher µg of 50% inhibition) corresponded to urea treated samples.

Protein profiles did not show important differences between depigmentation treatments, while allergenic profiles did so. The only common differences refer to urea treatments, that reduce bands intensity. Western blot of depigmented with basic pH decrease band recognition in high molecular weight.

GENERAL CONCLUSIONS

1. The protein content is higher in "depigmented" extracts than in native extracts.
2. High pH treatments decreased the recognition of high molecular weight proteins in an immunoblot.

The invention claimed is:

1. A process for producing a depigmented allergen extract, the process comprising:

a) basifying a native allergen extract to pH 7 to 11 for 1 minute to 24 hours, wherein the native allergen extract is derived from a source material selected from the group consisting of *Phleum pratense, Olea europaea*, and *Dermatophagoides pteronyssinus*; then b) subjecting the extract to a first molecular fraction removal step to remove molecules having a molecular size of less than 3.5 kDa; and c) adjusting the pH to neutrality to produce a depigmented allergen extract.

2. The process according to claim 1, further comprising polymerisation, wherein the polymerisation comprises:

d) contacting a depigmented allergen extract with an aldehyde; then e) subjecting the extract to a second molecular fraction removal step to remove molecules having a molecular size of less than 100 kDa; then f) carrying out step e) at 3-15 degrees centigrade until the allergen extract has a conductivity of below 210 µS/cm, measured at room temperature, and/or is absent of aldehyde as determined by UV or visible scanning, to obtain a depigmented polymerised allergen extract.

3. The process according to claim 1, wherein the native allergen extract is basified to a pH of at least 7.5 and the native allergen extract is basified to a pH of no more than 11.

4. The process according to claim 1, wherein step a) is carried out for about 15 minutes.

5. The process according to claim 2, wherein the first and second low molecular fraction removal steps b) and e) each independently comprise an ultrafiltration step, a diafiltration step, a dialysis step, or filtration.

6. The process according to claim 1, wherein the pH in step c) is adjusted to between pH 7.0 and pH 7.5.

7. The process according to claim 2, wherein step e) is carried out at a temperature of 3-5 degrees centigrade.

8. The process according to claim 3, wherein the native allergen extract is basified to a pH of at least 8.0.

9. The process according to claim 3, wherein the native allergen extract is basified to a pH of no more than 10.5.

10. The process according to claim 6, wherein the pH in step c) is adjusted to between pH 7.3 and pH 7.4.

11. The process according to claim 1, wherein the source material is *Dermatophagoides pteronyssinus*.

* * * * *